(12) United States Patent
Usuda

(10) Patent No.: US 6,748,424 B1
(45) Date of Patent: Jun. 8, 2004

(54) INFORMATION PROVIDING SYSTEM

(75) Inventor: Hiroshi Usuda, Ibaraki (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/463,554

(22) PCT Filed: May 28, 1999

(86) PCT No.: PCT/JP99/02863

§ 371 (c)(1),
(2), (4) Date: Apr. 24, 2000

(87) PCT Pub. No.: WO99/63459

PCT Pub. Date: Dec. 9, 1999

(30) Foreign Application Priority Data

May 29, 1998 (JP) .......................... P10-148560

(51) Int. Cl.$^7$ .............................. G06F 15/16
(52) U.S. Cl. ................. 709/217; 709/229; 382/115; 382/181
(58) Field of Search ............... 283/17, 73, 462.01; 382/115, 106, 181, 195; 709/217, 218, 223, 229

(56) References Cited

U.S. PATENT DOCUMENTS

| | | | | |
|---|---|---|---|---|
| 5,640,193 A | * | 6/1997 | Wellner ..................... | 709/218 |
| 5,841,886 A | * | 11/1998 | Rhoads ........................ | 382/115 |
| 5,995,105 A | * | 11/1999 | Reber et al. ................. | 709/217 |
| 6,012,102 A | * | 1/2000 | Shachar ....................... | 709/223 |
| 6,076,734 A | * | 6/2000 | Dougherty et al. ..... | 235/462.01 |
| 6,115,513 A | * | 9/2000 | Miyazaki et al. ........... | 382/181 |

FOREIGN PATENT DOCUMENTS

| | | | |
|---|---|---|---|
| EP | 0 665 504 A1 | * | 8/1995 |
| JP | 07-115474 A | * | 5/1995 |
| JP | 07-146875 A | * | 6/1995 |
| JP | 07-219959 A | * | 8/1995 |
| JP | 09-330328 | * | 12/1997 |
| JP | 10-091532 | * | 4/1998 |
| JP | 10-093949 A | * | 4/1998 |

OTHER PUBLICATIONS

Hiroshi Usuta, "Kami' ni yoru multimedia interactive system: 'paper browser'" Jouhou shori Gakkai Dai 56 Kai (Heisei 10 Nen Zenki) Zenkoku Taikai Kouen Rombunshuu, Mar. 17, 1998, pp. 4–5 to 4–6 (English Abstract Provided).

Ken Suzuki et al., "Pad seat to web page o kumiawaseta VOD user interface no hyouka", Jouhou Shori Gakkai Rombunshuu, Mar. 17, 1998, pp. 4–1 to 4–2; Figs. 1, 3 (English Abstract Provided).

Hiroshi Usuta, "Ultra Magic Key ni yoru interactive field (Interactive Field using Ultra Magic Key)", Nippon software Kagakkai Dai 15 Kai Taikai Rombunshuu (15$^{th}$ Conference Proceedings Japan Society for Software Science and Technology), Sep. 8, 1998, pp 209–212 (English Abstract Provided).

* cited by examiner

Primary Examiner—Zarni Maung
(74) Attorney, Agent, or Firm—Jay H. Maioli

(57) ABSTRACT

A field player 2 transmits to a field generator 1 an image of an ultra magic key (UMK) sticker 7 on which an image pattern instructing transmission of predetermined data to the field player 2 is printed. The field generator 1 transmits information corresponding to the image pattern of the UMK sticker 7 to the field player 2. The field player 2 reproduces information such as an image or a sound transmitted from the field generator 1.

12 Claims, 28 Drawing Sheets

INFORMATION PROVIDING SYSTEM

TECHNICAL FIELD

This invention relates to an information providing system, an information providing device, an information providing method, an information processing device, an information processing method, and a program providing medium which enable a user to obtain information corresponding to an information input medium having a coded image pattern when it is loaded.

BACKGROUND ART

An information providing device for providing various bidirectional information in response to requests provides information desired by a user only when the user operates a pointing device such as a keyboard, a touch panel, a mouse, or a track ball to input a key word of the desired information or information for retrieving the desired information. For example, in the case where the user searches for information concerning Japanese popular music of the 1970s, the user needs to identify and select key words of information which the user wants to obtain, and operate an input device such as the keyboard to input the selected key words such as "music", "1970s", "Japan", and "popular".

Similarly, as the user operates the touch panel to enter available languages, the information providing device changes the information providing from. Attribute information of the user including sex, age, birthplace, personal preference, whether the user is a contractor who made a predetermined contract, etc. is reflected on the provided information only when the user inputs such information.

Conventionally, it is normal that the interface for inputting the attribute information of the user to the information providing device is constituted to determine the priority of input in accordance with the frequency of use of the attributes so as to reduce the trouble in input on the average for a large number of users. For example, in comparison between sex and preference in food such as Japanese, Western, or Chinese, the attribute of sex is at a higher frequency of use except for some special cases. Therefore, it is normal that the attribute of sex can be set more easily while the preference in food can be inputted after a number of operations. The attribute information of the user differs in the priority, depending on the status at that time and the individuals. The attribute information of the user cannot be set in a predetermined manner unless the input screen is changed a number of times every time the attribute information of the user is inputted.

In the case where the user wants to obtain data such as music or an image, it is difficult to obtain the information if the user cannot input a key word or key words associated with the music or the image. For example, even in the case where the user knows the image of a motorcycle of the name "NR" which ran the 1985 two-wheel world road racing, 500-cc class, and can recognize the image of the motorcycle itself, the user cannot retrieve the image if he/she does not know the name "NR". Similarly, in the case of music, the user cannot obtain data of a predetermined tune if he/she does not know the name of tune, composer, performer, etc.

Also, in the case where only Japanese is used on the first screen for instructing operation, a user who does not understand Japanese cannot carry out further operation.

Moreover, in the case where the information providing device provides information by means of radio waves or infrared rays, the attribute information of the user is not stored and therefore must be inputted for every use. Furthermore, if a receiving device is small in consideration of the portability, selectable input means such as a switch has less variety and the user is required to carry out more complicated operation in comparison with the case where a keyboard or a touch panel of a stationary device is used.

DISCLOSURE OF THE INVENTION

Thus, in view of the foregoing status of the art, it is an object of the present invention to make it possible to obtain information of user's demand and attribute and provide information matching the user's information by simple operation on the user side.

An information providing system according to the present invention includes: an information providing device including image recognition means for recognizing an image pattern obtained by coding predetermined information, information detection means for detecting the image pattern recognized by the image recognition means, thereby detecting the predetermined coded information, information storage means for storing transmission information to be transmitted, information transmission means for transmitting a signal including predetermined transmission information of the transmission information stored in the information storage means, and information output control means for controlling the information transmission means on the basis of the predetermined information detected by the information detection means so as to output the predetermined transmission information of the transmission information stored in the information storage means; an information input medium having information instructing the operation of the information providing device as an image pattern of coded image data; and an information processing device including image input means for inputting the image data of the information input medium, image data transmission means for transmitting the image data inputted by the image input means to the information providing device, signal receiving means for receiving the signal including the predetermined information outputted from the information providing device, and information reproduction means for reproducing the predetermined information on the basis of the signal obtained by reception by the signal receiving means.

An information providing device according to the present invention includes: image recognition means for recognizing an image pattern obtained by coding predetermined information; information detection means for detecting the image pattern recognized by the image recognition means, thereby detecting the predetermined coded information; information storage means for storing transmission information to be transmitted; information transmission means for transmitting a signal including predetermined transmission information of the transmission information stored in the information storage means; and information output control means for controlling the information transmission means on the basis of the predetermined information detected by the information detection means so as to output the predetermined transmission information of the transmission information stored in the information storage means.

An information providing method according to the present invention includes: an image recognition step of recognizing an image pattern obtained by coding predetermined information; an information detection step of detecting the image pattern recognized at the image recognition step, thereby detecting the predetermined coded information; and an information transmission step of reading out predetermined transmission information from information storage means on the basis of the predetermined information detected at the information detection step and transmitting a signal including the predetermined transmission information.

A program providing medium according to the present invention provides a program readable on a computer which executes processing including: an image recognition step of recognizing an image pattern obtained by coding predetermined information; an information detection step of detecting the image pattern recognized at the image recognition step, thereby detecting the predetermined coded information; and an information transmission step of reading out predetermined transmission information from information storage means on the basis of the predetermined information detected at the information detection step and transmitting a signal including the predetermined transmission information.

An information processing device according to the present invention includes: image input means for inputting image data of an information input medium having information instructing the operation of an information providing device as an image pattern of coded image data; image data transmission means for transmitting the image data inputted by the image input means to the information providing device; signal receiving means for receiving a signal including the predetermined information outputted from the information providing device; and information reproduction means for reproducing the predetermined information on the basis of the signal obtained by reception by the signal receiving means.

An information processing method according to the present invention includes: an image input step of inputting image data of an information input medium having information instructing the operation of an information providing device as an image pattern of coded image data; an image data transmission step of transmitting the image data inputted at the image input step to the information providing device; a signal receiving step of receiving a signal including the predetermined information outputted from the information providing device; and an information reproduction step of reproducing the predetermined information on the basis of the signal obtained by reception at the signal receiving step.

A program providing medium according to the present invention provides a program readable on a computer which executes processing including: an image input step of inputting image data of an information input medium having information instructing the operation of an information providing device as an image pattern of coded image data; an image data transmission step of transmitting the image data inputted at the image input step to the information providing device; a signal receiving step of receiving a signal including the predetermined information outputted from the information providing device; and an information reproduction step of reproducing the predetermined information on the basis of the signal obtained by reception at the signal receiving step.

BEST MODE FOR CARRYING OUT THE INVENTION

Preferred embodiments of the present invention will now be described in detail with reference to the drawings.

Figure 1:
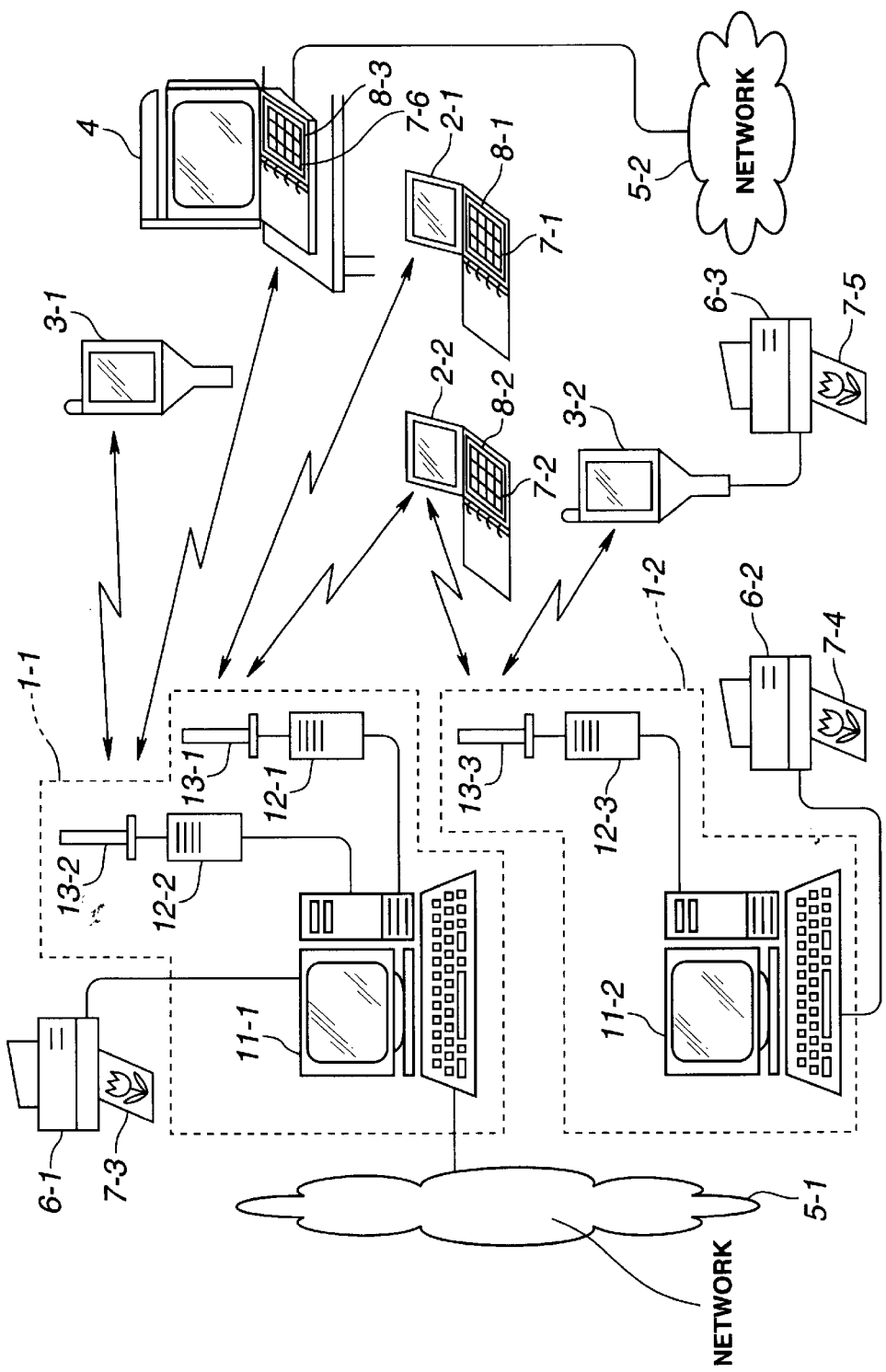
FIG. 1 shows the structure of an information providing system to which the present invention is applied.

FIG. 1 shows the structure of an information providing system to which the present invention is applied.

This information providing system has field generators 1-1 and 1-2 (hereinafter simply referred to as the field generator 1 unless they must be discriminated individually), field players 2-1 and 2-2 (hereinafter simply referred to as the field player 2 unless they must be discriminated individually), field recorders 3-1 and 3-2 (hereinafter simply referred to as the field recorder 3 unless they must be discriminated individually), and a field desk 4.

The field generator 1 transmits data to the field player 2, the field recorder 3 and the field desk 4 within a predetermined range, using radio waves.

In the information providing system shown in FIG. 1, the field generator 1-1 transmits data to the field players 2-1 and 2-2, the field recorder 3-1, and the field desk 4. The field generator 1-2 transmits data to the field player 2-2, the field recorder 3-2, and the field desk 4. The field generator 1 and the field desk 4 are connected to a network 5-1 or a network 5-2 and can transmit data to each other through the network 5-1 or the network 5-2.

The field player 2, the field recorder 3, and the field desk 4 reproduce information such as static images, dynamic images, sounds, and characters on the basis of the data transmitted from the field generator 1. The field player 2 and the field recorder 3 are small portable terminals that can be carried out by the user. The field player 2-1 can have a refill 8-1 arranged at a predetermined position therein. The field player 2-2 can have a refill 8-2 arranged at a predetermined position therein. The field desk 4 can have a refill 8-3 arranged at a predetermined position therein. Hereinafter, the refills 8-1 to 8-3 are simply referred to as the refill 8 unless they must be discriminated individually. In the field player 2 and the field desk 4, one or a plurality of refills 8 needed by the user can be arranged. The user can turn the refills 8 similarly to pages of a book, if necessary.

UMK (ultra magic key) stickers 7-1 to 7-6 (hereinafter simply referred to as the UMK sticker 7 unless they must be discriminated individually) can be stuck to the refills 8 by the user. An image pattern for giving predetermined instruction to the field generator 1 is printed on the surface of the UMK sticker 7. When the refill 8 having the UMK sticker 7 stuck thereto is loaded, the field player 2 and the field desk 4 input the image of the refill 8 and transmit the image data to the field generator 1.

A field printer 6-1 is connected to the field generator 1-1. A field printer 6-2 is connected to the field generator 1-2. A field printer 6-3 is connected to the field recorder 3. Hereinafter, the field printers 6-1 to 6-3 are simply referred to as the field printer 6 unless they must be discriminated individually. The field printer 6 can also be connected to the field desk 4. The field printer 6 prints the UMK sticker 7 on the basis of a signal supplied from the field generator 1, the field recorder 3 or the field desk 4 which is connected thereto.

The owner of the field generator 1 can distribute the printed UMK sticker 7 to the owners of the field player 2 and the field desk 4 by means of the postal service or a newspaper advertisement. The user of the field recorder 3 or the field desk 4 can connect the field printer 6 to the field recorder 3 or the field desk 4 to print a predetermined UMK sticker 7.

The field generator 1-1 is constituted by a server 11-1, transmitter-receivers 12-1 and 12-2, and antennas 13-1 and 13-2. The server 11-1 supplies signals including data to the transmitter-receivers 12-1 and 12-2 and also receives signals including data from the transmitter-receivers 12-1 and 12-2. The transmitter-receiver 12-1 transmits signals through the antenna 13-1 by a signal transmission system such as FDMA (frequency division multiple access), TDMA (time division multiple access), or CDMA (code division multiple access) which enables simultaneous communication with a plurality of field players 2, field recorders 3 or field desks 4 through a shared radio transmission line. The transmitter-receiver 12-1 also receives signals from the field player 2, the field recorder 3 and the field desk 4 through the antenna 13-1. Similarly, the transmitter-receiver 12-2 transmits signals through the antenna 13-2 and receives signals through the antenna 13-2.

The field generator 1-2 is constituted by a server 11-2, a transmitter-receiver 12-3, and an antenna 13-3. The server 11-2 supplies signals to the transmitter-receiver 12-3 and receives signals from the transmitter-receiver 12-3, similarly to the server 11-1. The transmitter-receiver 12-3 transmits signals through the antenna 13-3 and receives signals through the antenna 13-3, similarly to the transmitter-receiver 12-1.

Hereinafter, the servers 11-1 and 11-2 are simply referred to as the server 11 unless they must be discriminated individually. The transmitter-receivers 12-1 to 12-3 are simply referred to as the transmitter-receiver 12 unless they must be discriminated individually. The antennas 13-1 to 13-3 are simply referred to as the antenna 13 unless they must be discriminated individually.

Figure 2:
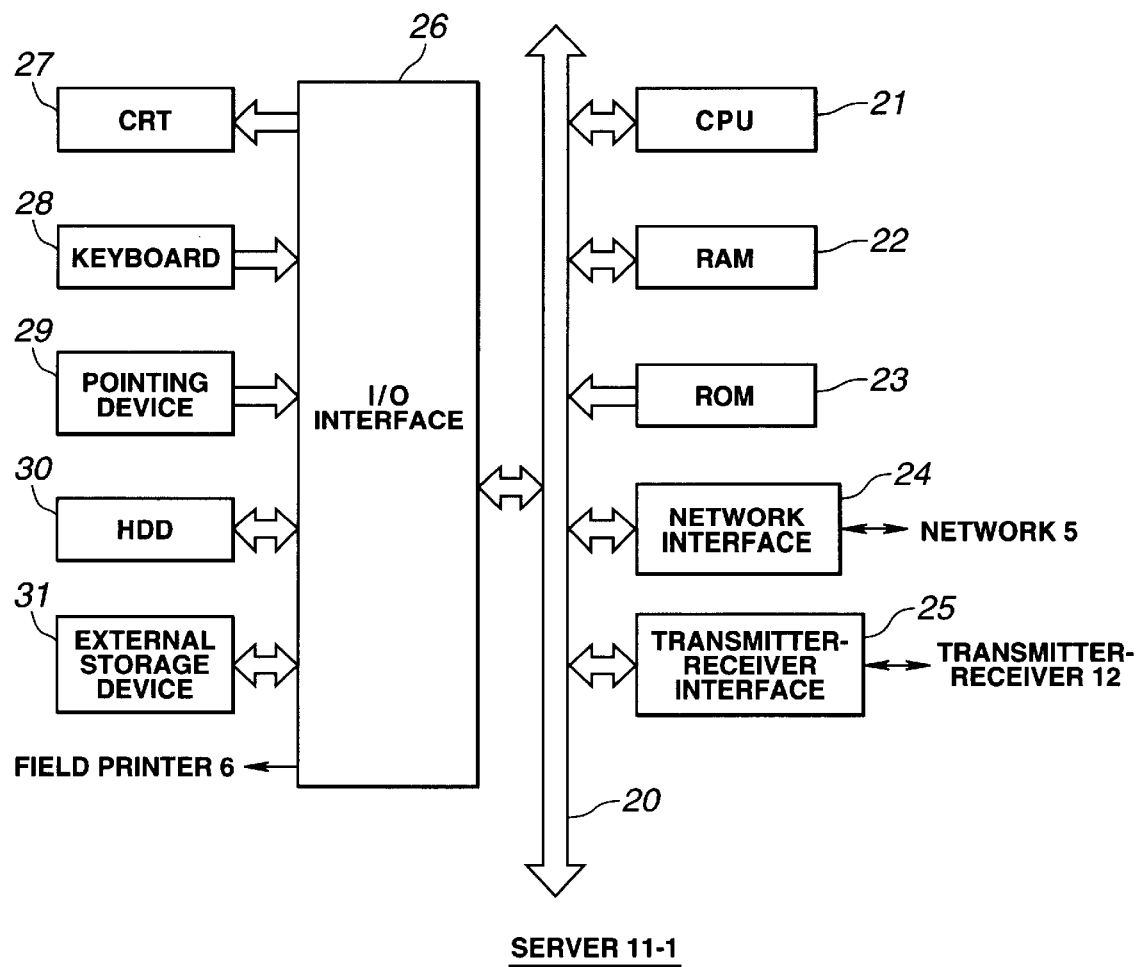
FIG. 2 shows the structure of hardware of a server in the information providing device.

FIG. 2 shows the structure of hardware of the server 11-1. This server 11-1 has a CPU (central processing unit) 21, a RAM (random access memory) 22, a ROM (read only memory) 23, a network interface 24, a transmitter-receiver interface 25, and an input/output interface 26 which are connected to an internal bus 20. The server 11-1 also has a CRT (cathode-ray tube) 27, a keyboard 28, a pointing device 29 such as a mouse or a track ball, an HDD (hard disk drive) 30, and an external storage device 31 such as an MO (magneto-optical) disc drive or a tape drive which are connected to the input/output interface 26.

The CPU 21 actually executes various programs. The RAM 22 stores programs used for the execution by the CPU 21 and parameters suitably changing in the execution. The ROM 23 basically stores fixed data of the programs and operational parameters used by the CPU 21.

The network interface 24 adjusts data in conformity to the format required by the network 5 connected thereto and outputs the data in a predetermined signal format. Also, the network interface 24 receives signals from the network 5 and extracts data required by the server 11 from the received signals. The transmitter-receiver interface 25 adjusts data in conformity to the format required by the transmitter-receiver 12 connected thereto and outputs the data in a predetermined signal format. Also, the transmitter-receiver interface 25 receives signals from the transmitter-receiver 12 and extracts data required by the server 11 from the received signals.

The CRT 27, the keyboard 28, the pointing device 29 such as a mouse or a track ball, the HDD 30, and the external storage device 31 are connected to the internal bus through the input/output interface 26. The CRT 27 displays display data supplied from the CPU 21. The keyboard 28 supplies signals corresponding to the operation by the user to the CPU 21. The pointing device 29 supplies a predetermined signal to the CPU 21 in response to the operation by the user in accordance with the display on the CRT 27. The HDD 30 and the external storage device 31 store the programs stored in the RAM 23 in the execution by the CPU 21, the parameters and data necessary for the execution, and the data outputted through the network interface 24 or the transmitter-receiver interface 25. The data to the field printer 6-1 is outputted from the input/output interface 26 through a predetermined cable or infrared rays.

The CPU 21, the RAM 22, the ROM 23, the network interface 24, the transmitter-receiver interface 25, and the input/output interface 26 are connected with one another through the internal bus 20.

The structure of hardware of the server 11-2 is the same as the structure of hardware of the server 11-1.

Figure 3:
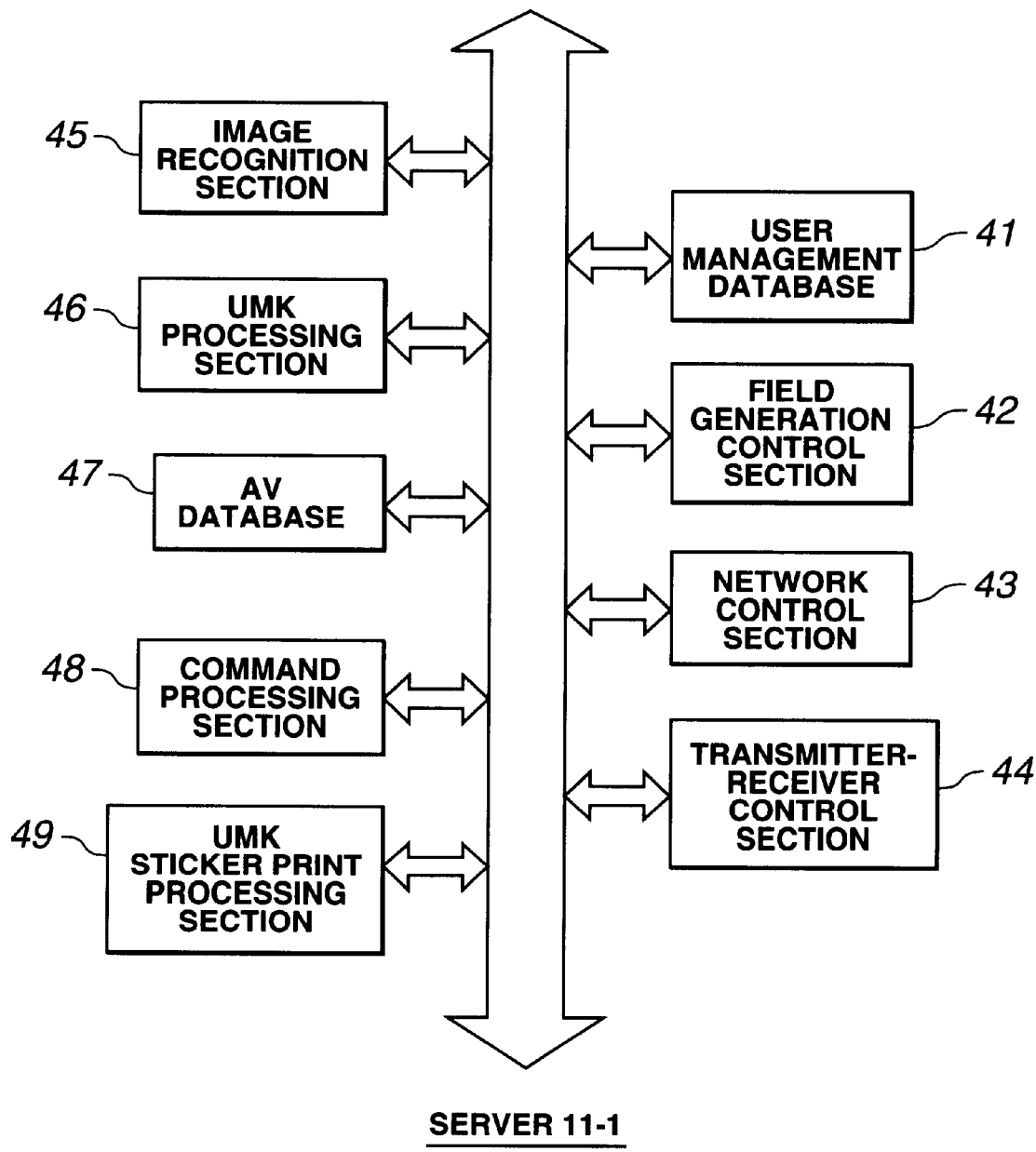
FIG. 3 shows the structure of a functional block of the server.

FIG. 3 shows the structure of a functional block realized by the CPU 21 of the server 11-1 executing a program. A user management database 41 stores data for identifying whether the user of the field player 2, the field recorder 3 or the field desk 4 in communication has made a predetermined contract or not, on the basis of the information obtained from a transmitter-receiver control section 44. A field generation control section 42 determines predetermined data to be outputted to each channel of the shared radio transmission line on the basis of the output of a UMK processing section 46 or a command processing section 48 and gives an instruction to the transmitter-receiver control section 44 to transmit the data stored in an AV (audio-visual) database 47.

A network control section 43 controls the network interface 24 and connects the server 11 to the network 5. The transmitter-receiver control section 44 converts the data outputted from the AV database 47 to a predetermined data format and controls the transmitter-receiver interface 25 to output the data to the transmitter-receiver 12. The transmitter-receiver control section 44 receives an image or a command signal transmitted from one or a plurality of field players 2, field recorders 3 or field desks 4 through the transmitter-receiver interface 25 and sends the received image or command signal to an image recognition section 45 or the command processing section 48.

The image recognition section 45 recognizes image information from the image signal transmitted from one or a plurality of field players 2 or field desks 4 and extracts necessary image information. The UMK processing section 46 converts the necessary image information extracted by the image recognition section 45 to a digital code and sends the digital code to the field generation control section 42. The AV database 47 stores data necessary for reproducing images, sounds, characters and the like to be supplied to the field player 2, the field recorder 3 or the field desk 4 and sends the data to the transmitter-receiver control section 44 in accordance with the instruction from the field generation control section 42. The command processing section 48 receives, from the transmitter-receiver control section 44, a code corresponding to a command signal sent from the field player 2, the field recorder 3 or the field desk 4 and gives an instruction corresponding to the code to a UMK sticker print processing section 49 or the field generation control section 42. The UMK sticker print processing section 49 receives the instruction from the command processing section 48 or the UMK processing section 46 and gives an instruction to the field printer 6-1 connected to the server 11-1 to print a predetermined UMK sticker.

The structure of the functional block of the server 11-2 is the same as the structure of the functional block of the server 11-1.

Figure 4:
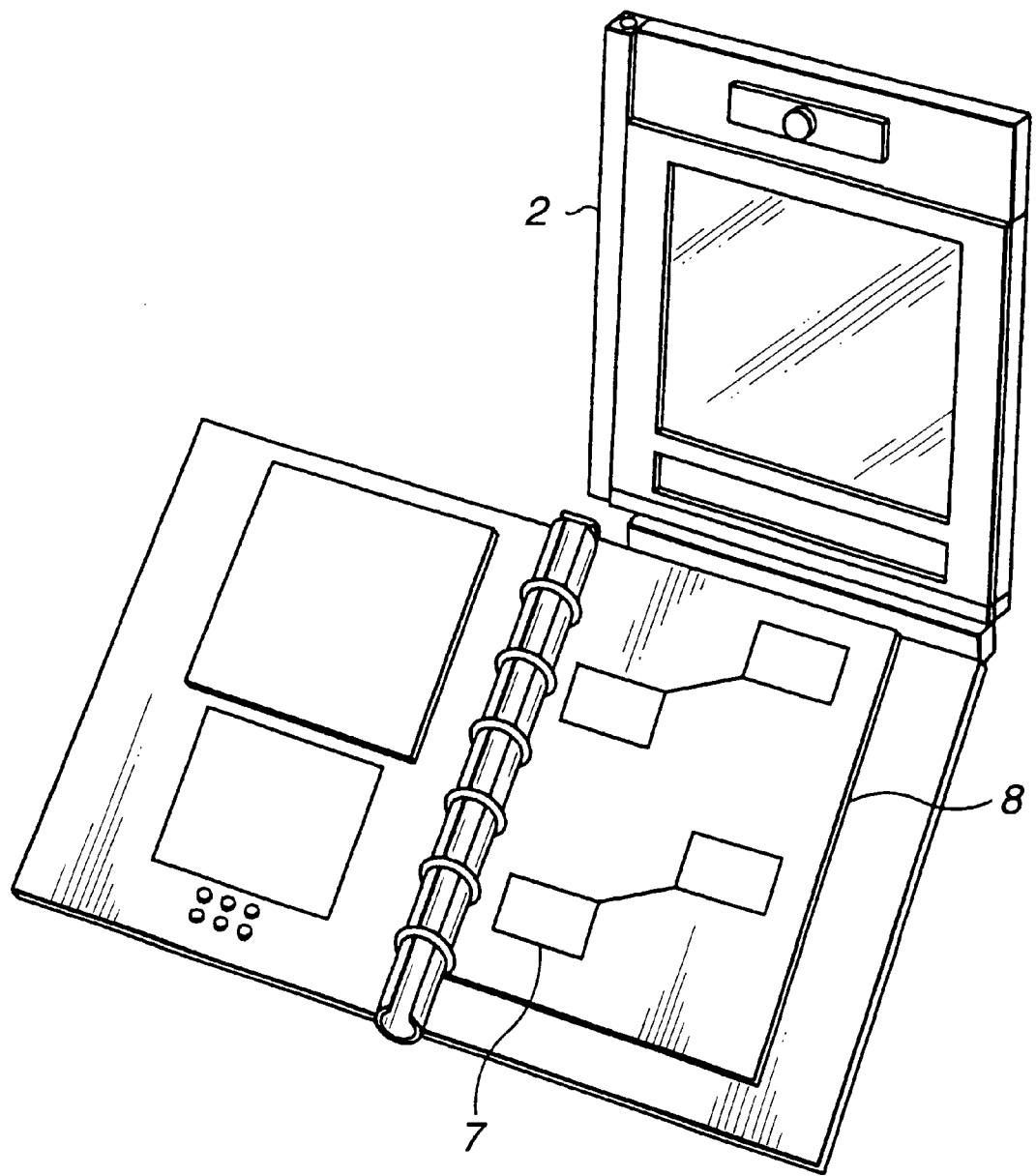
FIG. 4 is a perspective view showing the appearance of a field player in the information providing system.

FIG. 4 shows the appearance of the field player 2 in the used state. At a predetermined position in the field player 2, the refill 8 having the UMK sticker 7 stuck thereto is loaded.

Figure 5:
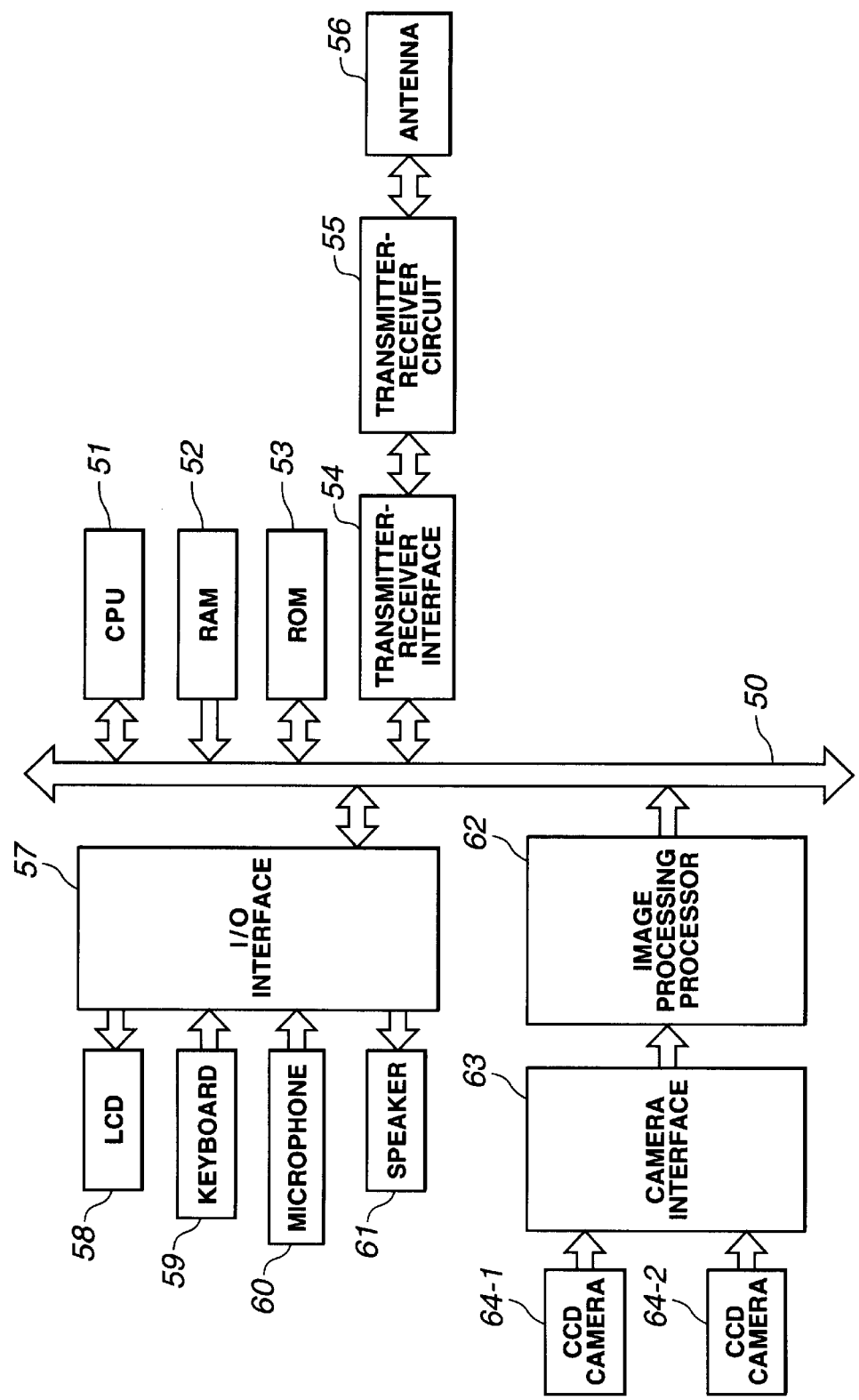
FIG. 5 shows the structure of hardware of the field player.

FIG. 5 shows the structure of hardware of the field player 2-1. This field player 2 2-1 has a CPU (central processing unit) 51, a RAM (random access memory) 52, a ROM (read only memory) 53, a transmitter-receiver interface 54, an input/output interface 57, and an image processing processor 62 which are connected to an internal bus 50. The field player 2-1 also has a transmitter-receiver circuit 55, connected to transmitter-receiver interface 54, an LCD (liquid crystal display) 58, a keyboard 59, a microphone 60 and a speaker 61 which are connected to the input/output interface 57, and CCD cameras 64-1 and 64-2 connected to the image processing processor 62 through a camera interface 63.

The CPU 51, the RAM 52, the ROM 53, the transmitter-receiver interface 54, the input/output interface 57, the LCD 58, and the keyboard 59 realize the same functions as those of the CPU 21, the RAM 22, the ROM 23, the transmitter-receiver interface 25, the input/output interface 26, the CRT 27, and the keyboard 28 of FIG. 2 and therefore will not be described further in detail. The transmitter-receiver circuit 55 changes a signal inputted from the transmitter-receiver interface 54 to a predetermined format and outputs the changed signal to an antenna 56. Also, the transmitter-receiver circuit 55 changes a signal inputted from the antenna 56 to a predetermined format and outputs the changed signal to the transmitter-receiver interface 54. The antenna 56 converts the electric signal of the predetermined format inputted from the transmitter-receiver circuit 55 to radio waves and radiates the radio waves into the air. Also, the antenna 56 converts radio waves transmitted from the field generator 1 to an electric signal and outputs the electric signal to the transmitter-receiver circuit 55.

The microphone 60 inputs a sound or speech of the user and supplies an electric signal corresponding to the sound or speech to the input/output interface 57. The speaker 61 converts the electric signal supplied from the input/output interface 57 to the sound or speech. The CCD cameras 64-1 inputs the image of the refill 8-1 and supplies a signal corresponding to the inputted image to the camera interface 63. The CCD camera 64-2 inputs an image including the user and supplies a signal corresponding to the inputted image to the camera interface 63. The camera interface 63 receives the signals from the CCD cameras 64-1 and 64-2, then changes the signals to a predetermined signal format, and outputs the signals to the image processing processor 62. The image processing processor 62 carries out necessary preprocessing, including elimination of noise, density processing, adjustment of threshold value, and position correction with respect to the image signal of the refill 8 inputted from the camera interface 63, and color correction and compression with respect to the image signal of the user. The image processing processor 62 then outputs the preprocessed signals to the CPU 51, the RAM 52 or the transmitter-receiver interface 54.

The structure of hardware of the field player 2-2 is the same as the structure of hardware of the field player 2-1.

Figure 6:
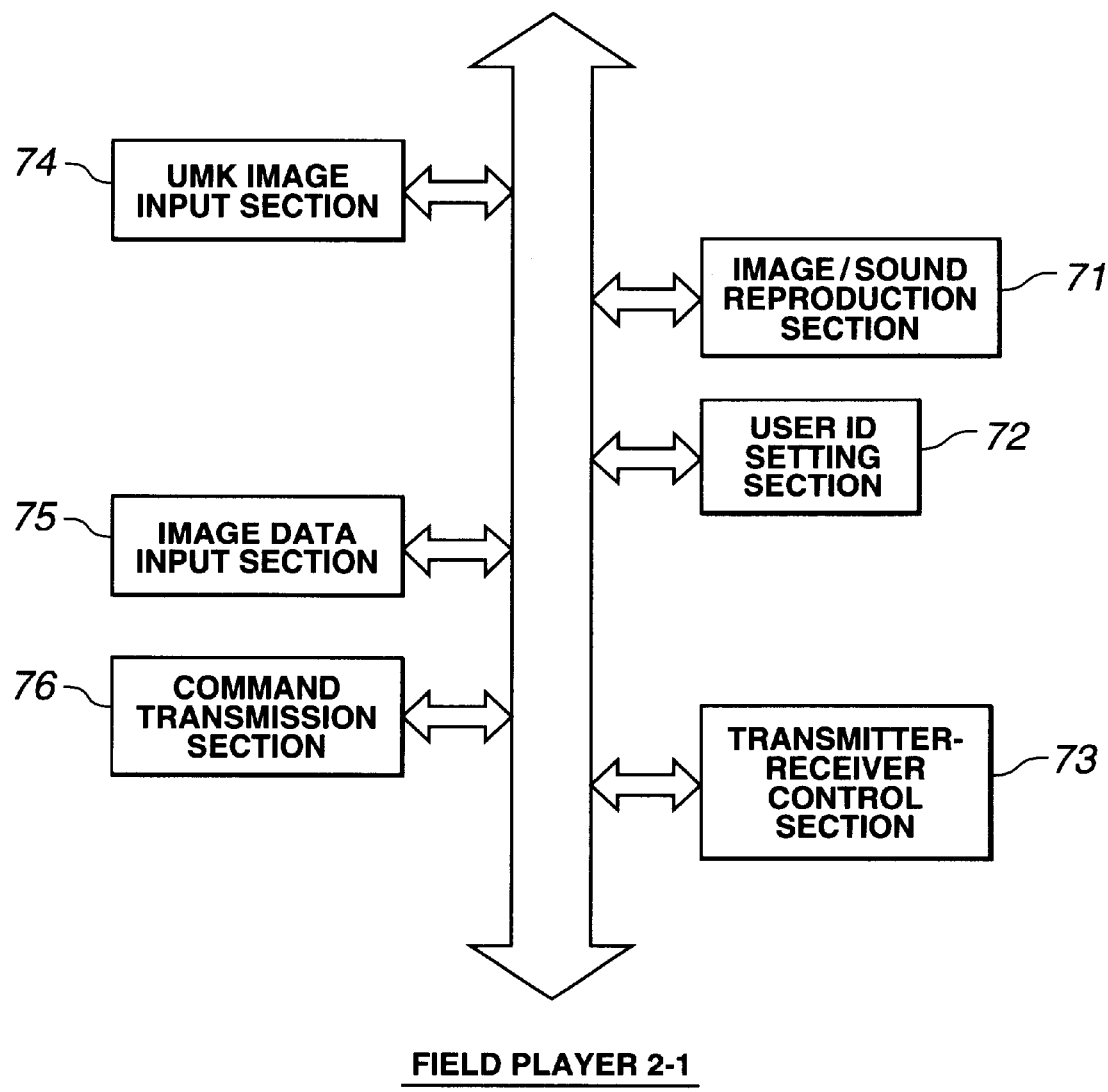
FIG. 6 shows the structure of a functional block of the field player.

FIG. 6 shows the structure of a functional block realized by the CPU 51 of the field player 2-1 executing a program. An image/sound reproduction section 71 receives data from the field generator 1 through a transmitter-receiver circuit control section 73 and causes the LCD 58 and the speaker 61 to reproduce the image and the sound, respectively. A user ID (identification data) setting section 72 stores ID for identifying a user who made a contract with an information providing service firm in the case where the user made a contract for information providing service with the information providing service fin. The user ID setting section 72 then adds the user ID to a UMK image transmitted from a UMK image input section 74 to the field generator 1 or to a command transmitted from a command transmission section 76 to the field generator 1. The transmitter-receiver circuit control section 73 converts the data outputted from the UMK image input section 74, an image data input section 75 and the command transmission section 76 to a predetermined data format and controls the transmitter-receiver interface 54 to output the data to the transmitter-receiver circuit 55, thereby transmitting the data to the field generator 1 through the antenna 56. The transmitter-receiver control section 44 receives the signal including the image or audio data transmitted from one or a plurality of field generators 1 through the transmitter-receiver interface 25 and sends the received data to the image/sound reproduction section 71.

The UMK image input section 74 outputs the image of the refill 8-1, inputted from the CCD camera 64-1 and preprocessed by the image processing processor 62 to the transmitter-receiver circuit control section 73. The image data input section 75 outputs the image data of the user preprocessed by the image processing processor 62 and the speech data of the user inputted from the microphone 60 to the transmitter-receiver circuit control section 73. The command transmission section 76 outputs the signal obtained by the operation of the keyboard 59 by the user to the transmitter-receiver circuit control section 73.

The structure of the functional block of the field player 2-2 is the same as the structure of the functional block of the field player 2-1.

Figure 7:
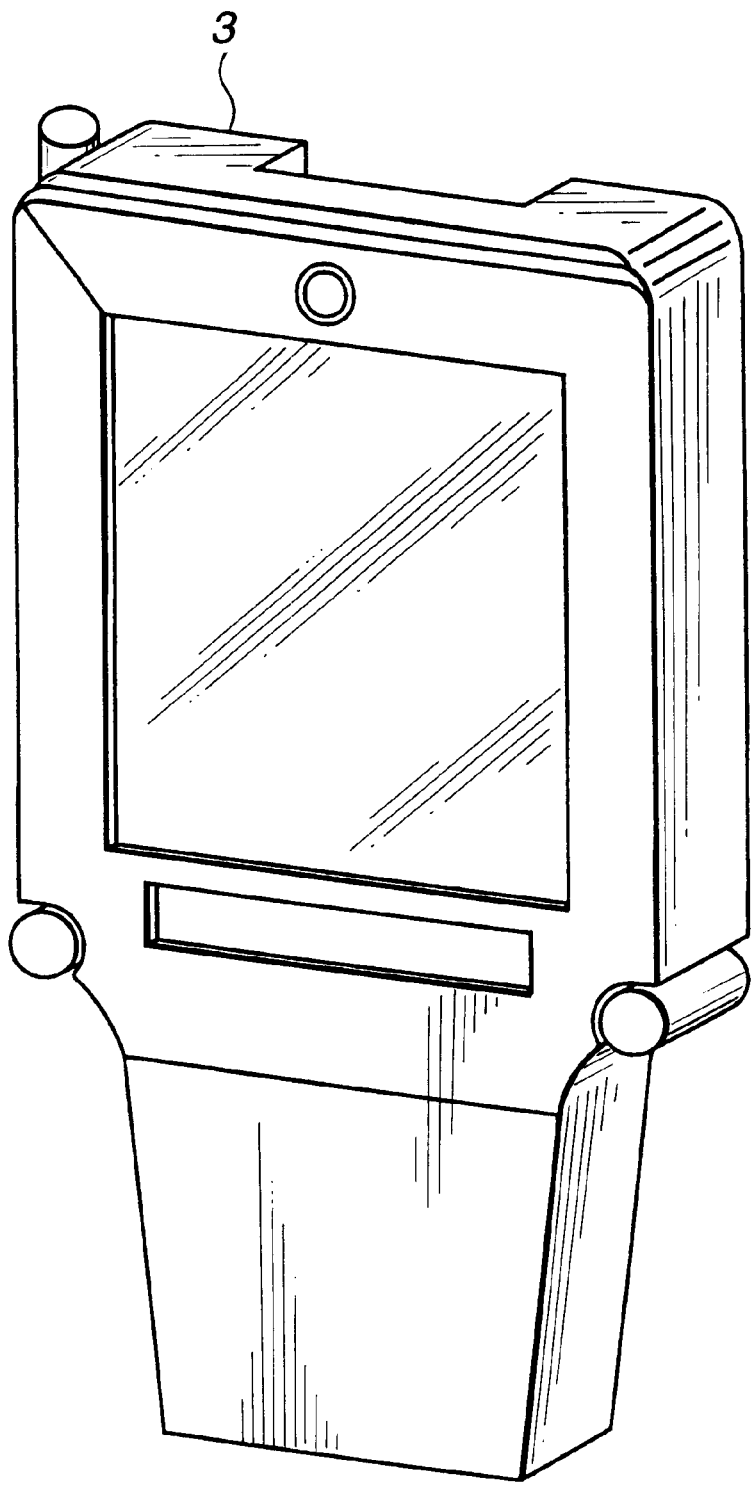
FIG. 7 is a perspective view showing the appearance of a field recorder in the information providing system.

FIG. 7 shows the appearance of the field recorder 3 in the used state.

Figure 8:
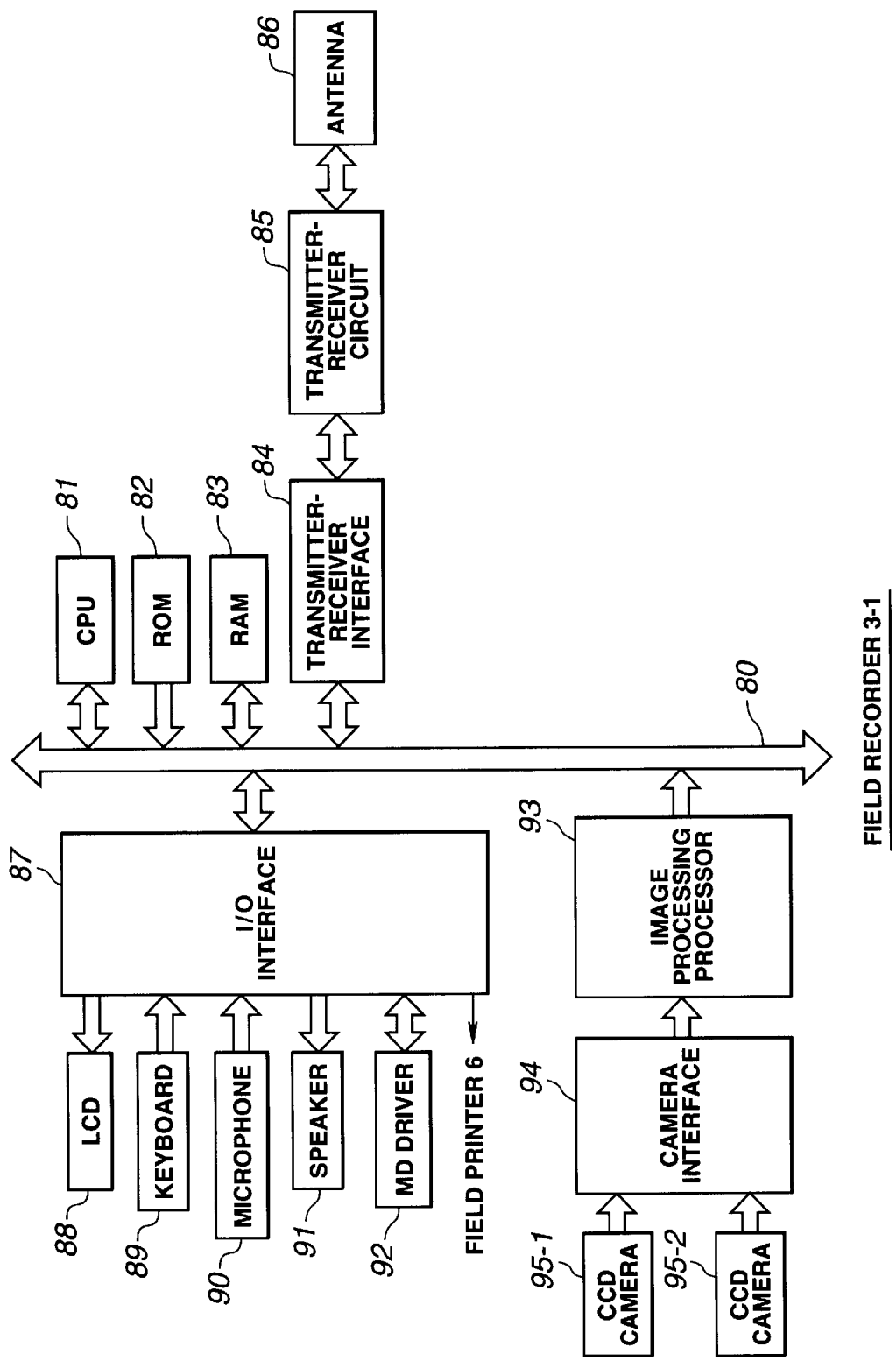
FIG. 8 shows the structure of hardware of the field recorder.

FIG. 8 shows the structure of hardware of the field recorder 3-1. This field recorder 3-1 has a CPU (central processing unit) 81, a RAM (random access memory) 82, a ROM (read only memory) 83, a transmitter-receiver interface 84, an input/output interface 87, and an image processing processor 93 which are connected to an internal bus 80. The field recorder 3-1 also has a transmitter-receiver circuit 85 connected to the transmitter-receiver interface 84, an LCD (liquid crystal display) 88, a keyboard 89, a microphone 90, a speaker 91 and an MD (Mini Disk (trademark)) driver 92 which are connected to the input/output interface 87, and CCD cameras 95-1 and 95-2 connected to the image processing processor 93 through a camera interface 94.

The CPU 81, the RAM 82, the ROM 83, the transmitter-receiver interface 84, the transmitter-receiver circuit 85, an antenna 86, the LCD 88, the microphone 90, the speaker 91, the CCD cameras 95-1 and 95-2, the camera interface 94, and the image processing processor 93 realize the same functions as those of the CPU 51, the RAM 52, the ROM 53, the transmitter-receiver interface 54, the transmitter-receiver circuit 55, the antenna 56, the LCD 58, the microphone 60, the speaker 61, the CCD cameras 64-1 and 64-2, the camera interface 63, and the image processing processor 62 of FIG. 5 and therefore will not be described further in detail.

The input/output interface 87 is connected to the LCD 88, the switch 89, the microphone 90, the speaker 91, the MD driver 92, and the internal bus, and adjusts the format and timing of signals. The data to the field printer 6 is outputted from the input/output interface 87 through a predetermined cable or infrared rays. The switch 89 supplies a signal corresponding to the operation by the user to the CPU 81. The MD driver 92 records data necessary for printing a UMK sticker and image and speech data onto an MD loaded thereon and reproduces the data in response to the instruction from the CPU 81.

The structure of hardware of the field recorder 3-2 is the same as the structure of hardware of the field recorder 3-1.

Figure 9:
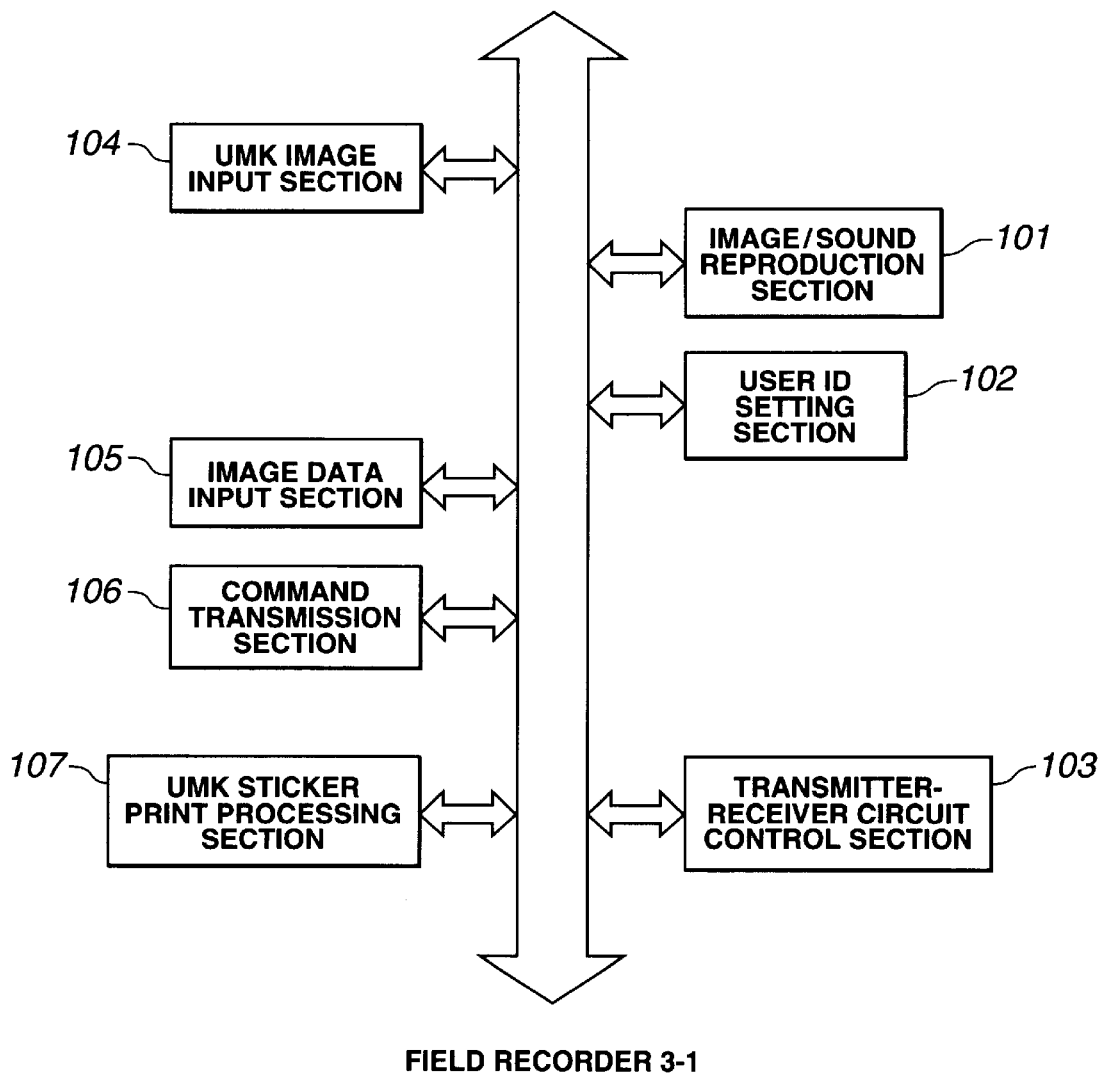
FIG. 9 shows the structure of a functional block of the field recorder.

FIG. 9 shows the structure of a functional block realized by the CPU 81 of the field recorder 3-1 executing a program. An image/sound reproduction section 101, a user ID setting section 102, a transmitter-receiver circuit control section 103, an image data input section 105, and a command transmission section 106 realize the same functions as those of the image/sound reproduction section 71, the user ID setting section 72, the transmitter-receiver circuit control section 73, the image data input section 75, and the command transmission section 76 of FIG. 6 and therefore will not be described further in detail. A UMK image input section 104 transmits data of an image to be printed on a UMK sticker, inputted from the CCD camera 95-1, to the field generator 1 through the transmitter-receiver circuit control section 103. A UMK sticker print processing section 107 instructs the field printer 6 (not shown) connected to the field recorder 3 to print a predetermined UMK sticker in accordance with the operation of the switch 89.

The structure of the functional block of the field recorder 3-2 is the same as the structure of the functional block of the field recorder 3-1.

Figure 10:
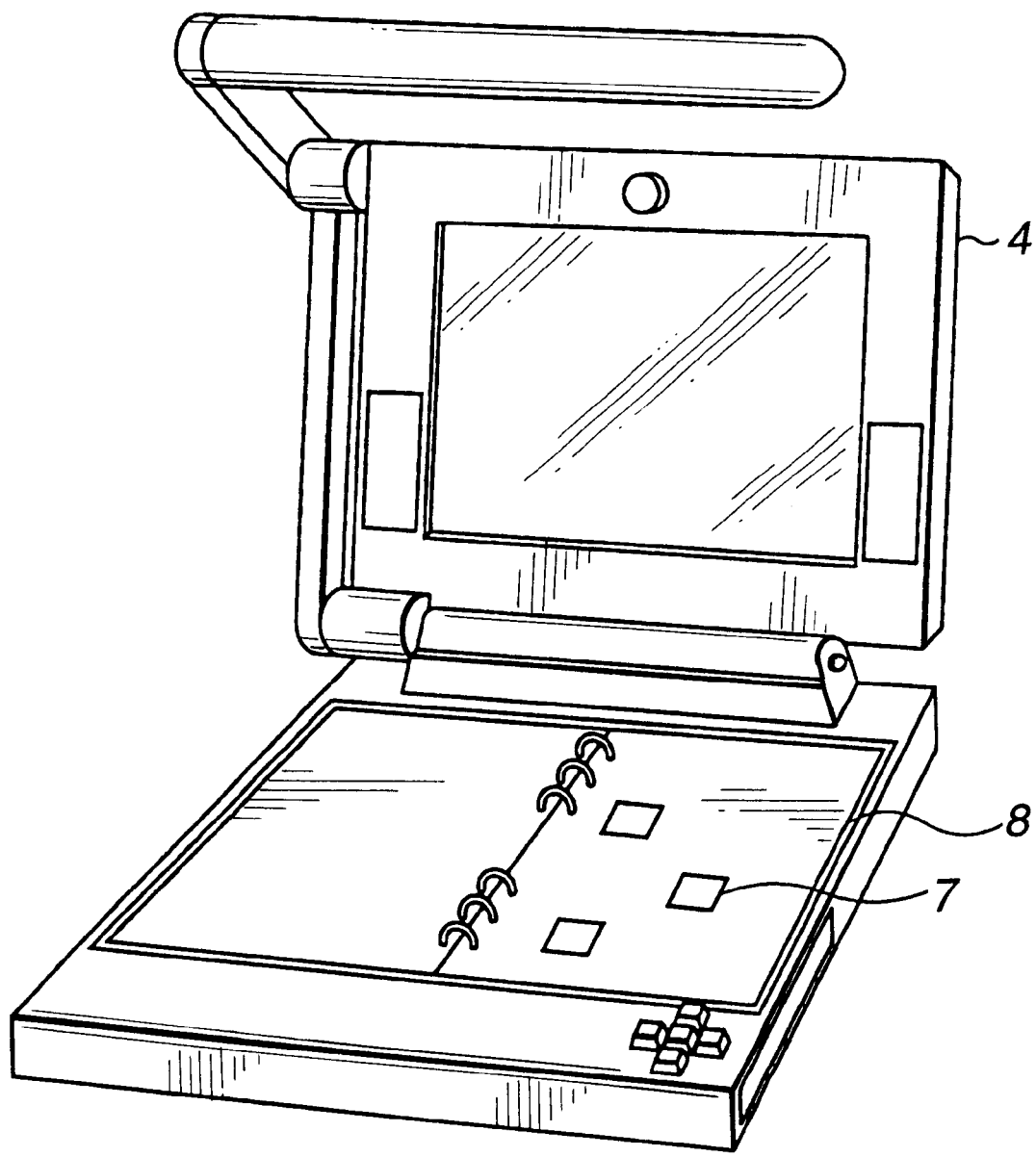
FIG. 10 is a perspective view showing the appearance of a field desk in the information providing system.

FIG. 10 shows the appearance of the field desk 4 in the used state. At a predetermined position in the field desk 4, the refill 8 having the UMK sticker 7 stuck thereto is loaded.

Figure 11:
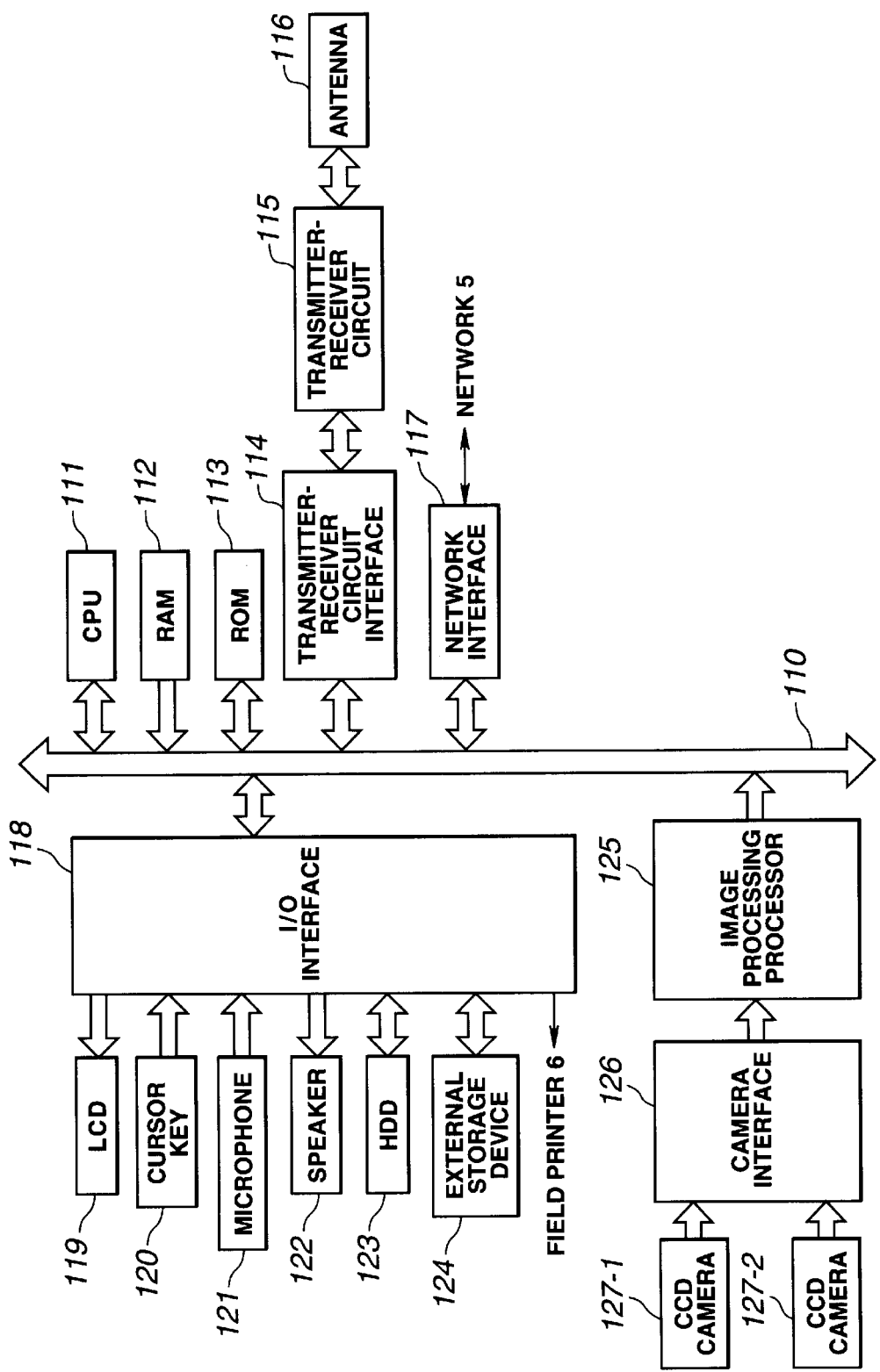
FIG. 11 shows the structure of hardware of the field desk.

FIG. 11 shows the structure of hardware of the field desk 4. This field desk 4 has a CPU (central processing unit) 111, a RAM (random access memory) 112, a ROM (read only memory) 113, a transmitter-receiver circuit interface 114, a network interface 117, an input/output interface 118, and an image processing processor 125 which are connected to an internal bus 110. The field desk 4 also has a transmitter-receiver circuit 115 connected to the transmitter-receiver circuit interface 114, an LCD (liquid crystal display) 119, a cursor key 120, a microphone 121, a speaker 122, an HDD (hard disk drive) 123 and an external storage device 124 which are connected to the input/output interface 118, and CCD cameras 127-1 and 127-2 connected to the image processing processor 125 through a camera interface 126.

The CPU 111, the RAM 112, the ROM 113, the network interface 117, the input/output interface 118, the LCD 119, the cursor key 120, the HDD 123, and the external storage device 124 realize the same functions as those of the CPU 21, the RAM 22, the ROM 23, the network interface 24, the input/output interface 26, the CRT 27, the keyboard 28, the HDD 30, and the external storage device 31 of FIG. 2, respectively, and therefore will not be described further in detail. The transmitter-receiver circuit interface 114, the transmitter-receiver circuit 115, an antenna 116, the microphone 121, the speaker 122, the CCD cameras 127-1 and 127-2, the camera interface 126, and the image processing processor 125 realize the same functions as those of the transmitter-receiver circuit interface 54, the transmitter-receiver circuit 55, the antenna 56, the microphone 60, the speaker 61, the CCD cameras 64-1 and 64-2, the cameras interface 63, and the image processing processor 62 of FIG. 5 and therefore will not be described further in detail.

Figure 12:
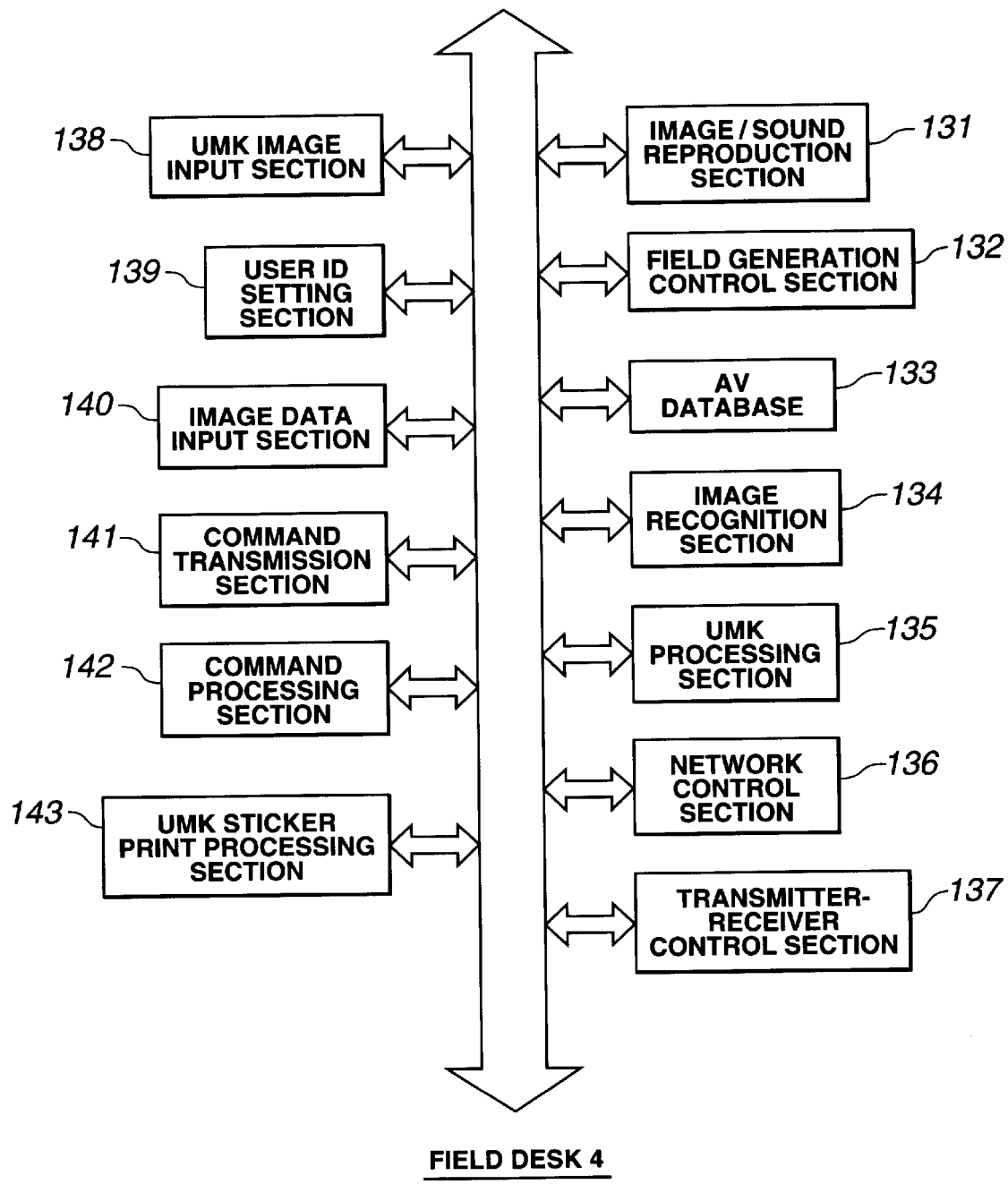
FIG. 12 shows the structure of a functional block of the field desk.

FIG. 12 shows the structure of a functional block realized by the CPU 111 of the field desk 4 executing a program. A field generation control section 132, an AV database 133, an image recognition section 134, a UMK processing section 135, a network control section 136, a command processing section 142, and a UMK sticker print processing section 143 realize the same functions as those of the field generation control section 42, the AV database 47, the image recognition section 45, the UMK processing section 46, the network control section 43, the command processing section 48, and the UMK sticker print processing section 49 of FIG. 3, respectively, and therefore will not be described further in detail. A transmitter-receiver circuit control section 137, a UMK image input section 138, a user ID setting section 139, and an image data input section 140 realize the same functions as those of the transmitter-receiver circuit control section 73, the UMK image input section 74, the user ID setting section 72, and the image data input section 75 of FIG. 6, respectively, and therefore will not be described further in detail. An image/sound reproduction section 131 causes the LCD 119 and the speaker 122 to reproduce the image and the sound, respectively, on the basis of the data stored in the AV database 133, in addition to the function of the image/sound reproduction section 71 of FIG. 6. A command transmission section 141 outputs a signal obtained by the operation of the cursor 120 by the user to the image/sound reproduction section 131, the field generation control section 132, the UMK processing section 135, the network control section 136, the UMK sticker print processing section 143, or the transmitter-receiver control section 137.

The operation of the field generator 1, the field player 2 and the field recorder 3 will now be described in detail.

Figure 13:
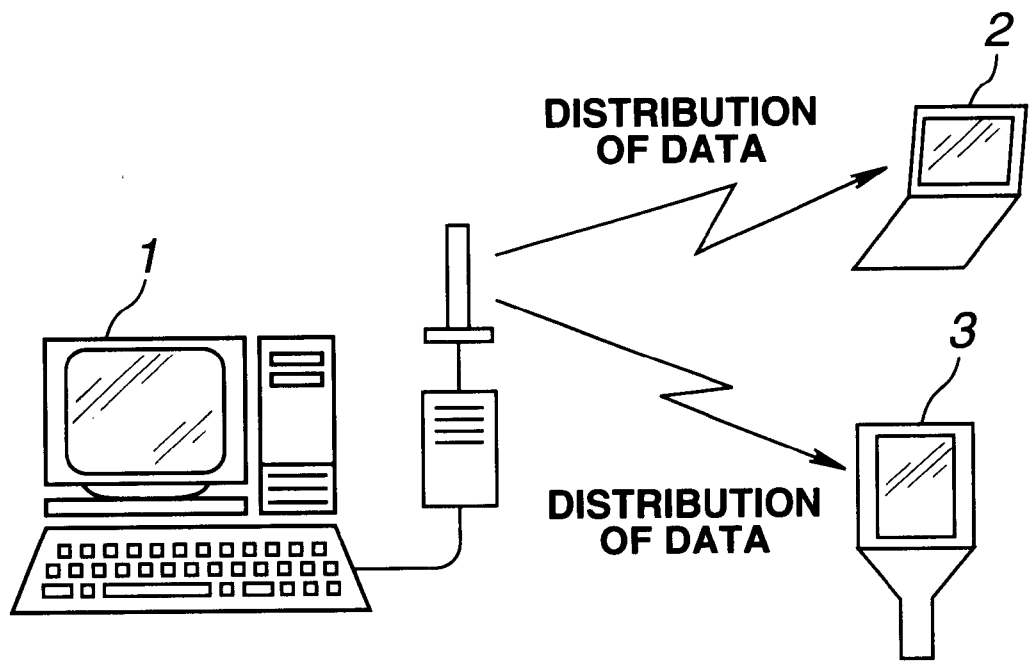
FIG. 13 illustrates the operation of the field player, the field recorder and the field generator, having no refill loaded thereon, in the information providing system.
Figure 14:
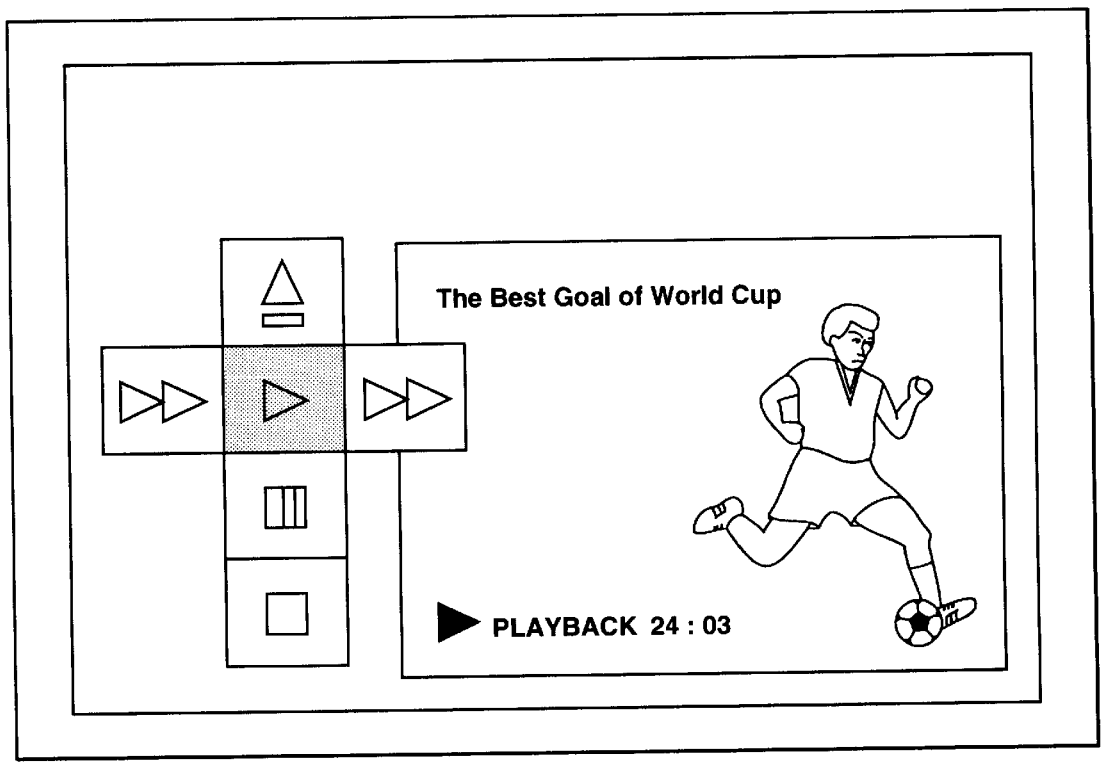
FIG. 14 shows an exemplary image reproduced by the field player or the field recorder in the information providing system.

FIG. 13 illustrates the operation of the field player 2, the field recorder 3 and the field generator 1 which have no refill 8 loaded thereon. The field generator 1 constantly transmits signals including data of static and dynamic images (hereinafter simply referred to as image or images unless they must be discriminated individually) and sounds on a predetermined channel sharing a radio transmission line. The field player 2 and the field recorder 3 which have no refill 8 loaded thereon and exist within the transmission range of the field generator 1 receive the signals including the image and audio data and reproduce the image and sound. FIG. 14 shows an exemplary image (where an image indicating the sound reproduction state is simultaneously displayed) reproduced by the field player 2 or the field recorder 3 in that case.

Figure 15:
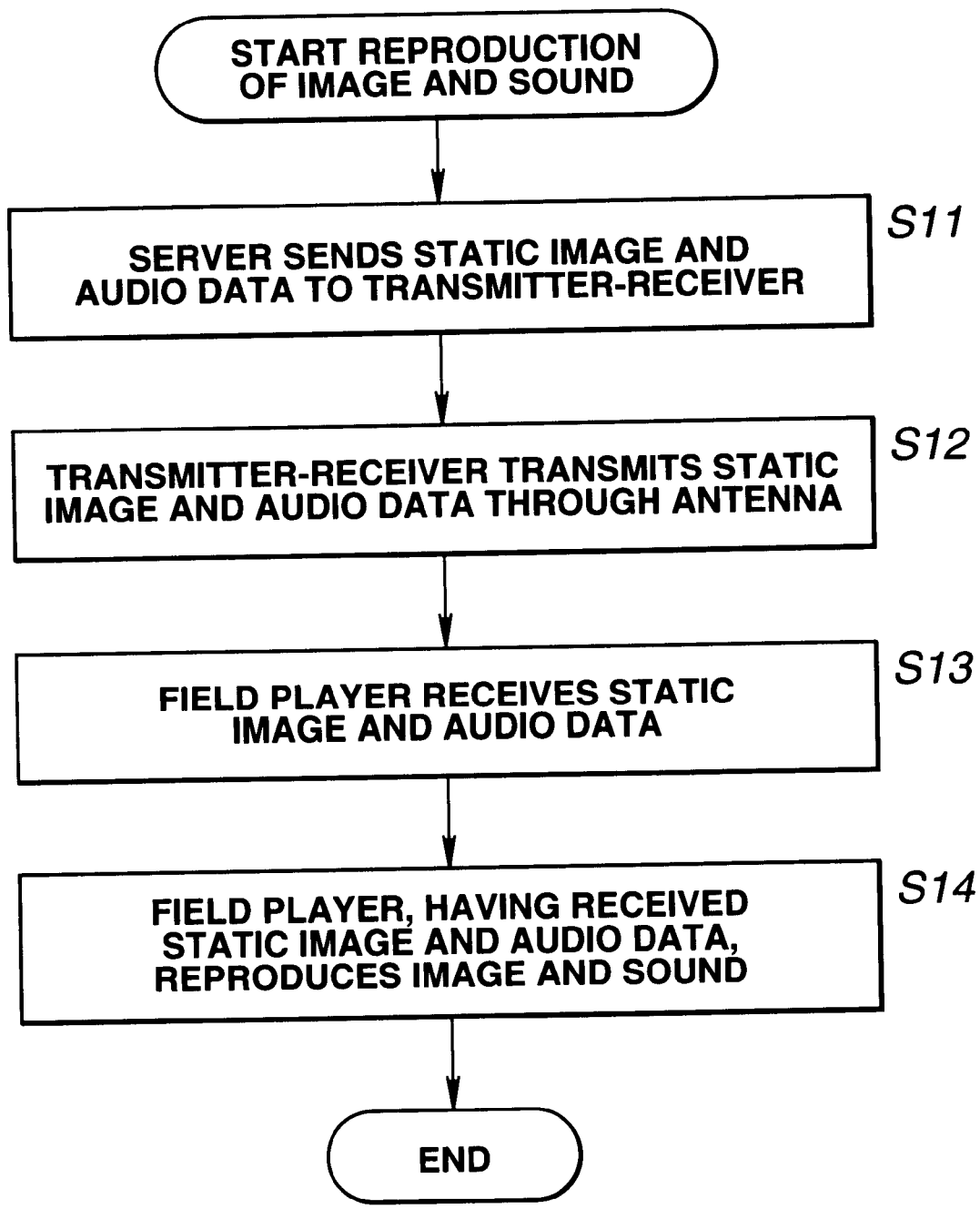
FIG. 15 is a flowchart for explaining the operation of the field player and the field generator, having no refill loaded thereon, in the information providing system.

FIG. 15 is a flowchart for explaining the operation of the field player 2 and the field generator 1 which have no refill 8 loaded thereon. At step S11, in accordance with the setting by the information provider using the field generator 1, the field generation control section 42 of the server 11 gives an instruction to the AV database 47 to send predetermined image and audio data to the transmitter-receiver control section 44. The transmitter-receiver control section 44 of the server 11 outputs the predetermined image and audio data to the transmitter-receiver 12. At step S12, the transmitter-receiver 12 converts the inputted predetermined image and audio data to a predetermined format and outputs the converted data on a predetermined channel to the antenna 13. The antenna 13 converts the inputted electric signal to a radio wave and transmits the radio wave.

At step S13, the field player 2 receives the radio wave through the antenna 56, then converts the radio wave to an electric signal of a predetermined format through the transmitter-receiver circuit 55 and the transmitter-receiver circuit interface 54 under the control of the transmitter-receiver circuit control section 73, and sends the converted data to the image/sound reproduction section 71. At step S14, on the basis of the inputted data, the image/sound reproduction section 71 of the field player 2 displays the image on the LCD 58 and reproduces the sound through the speaker 61.

In accordance with the similar procedure, the field recorder 3 reproduces the image and sound based on the signal transmitted from the field generator 1. In this case, the field generator 1 may provide the image and audio data on a plurality of channels so that the user of the field player 2 and the field recorder 3 can select a channel.

Figure 16:
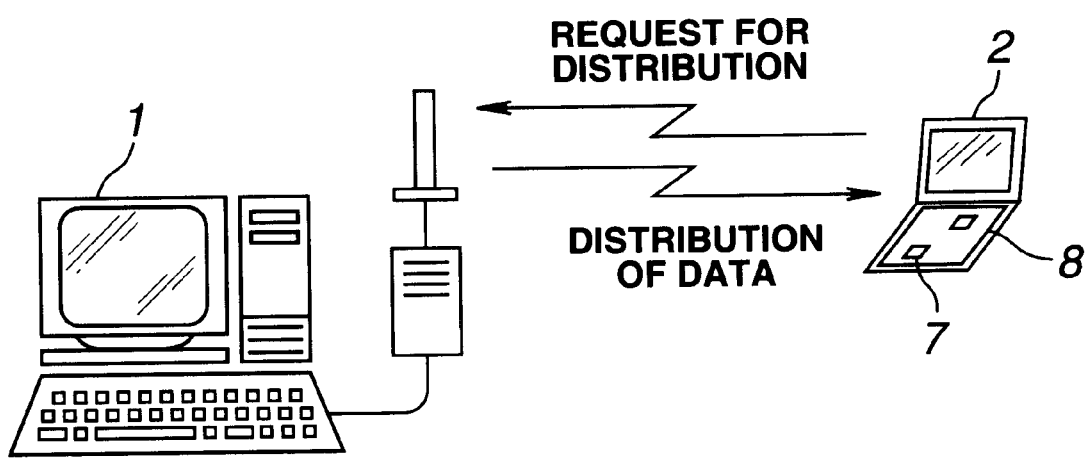
FIG. 16 illustrates the operation of the field player and the field generator, having a refill loaded thereon with a UMK sticker stuck to the refill, in the information providing system.

FIG. 16 illustrates the operation of the field player 2 and the field generator 1 in which the refill 8 having the UNK sticker 7 stuck thereto is loaded. The UMK sticker 7 used by the user of the field player 2 is a UMK sticker supplied from the information provider using the field generator 1 or a UMK sticker prepared by the user by using the field recorder 3 and the field printer 6. The field player 2, which exists within the transmission-reception range of the field generator and has the refill 8 loaded thereon with the UMK sticker 7 stuck to the refill 8, requests the field generator 1 to distribute information based on the UMK sticker 7. The field generator, having received the request, distributes the data based on the UMK sticker 7 to the field player 2.

Figure 17:
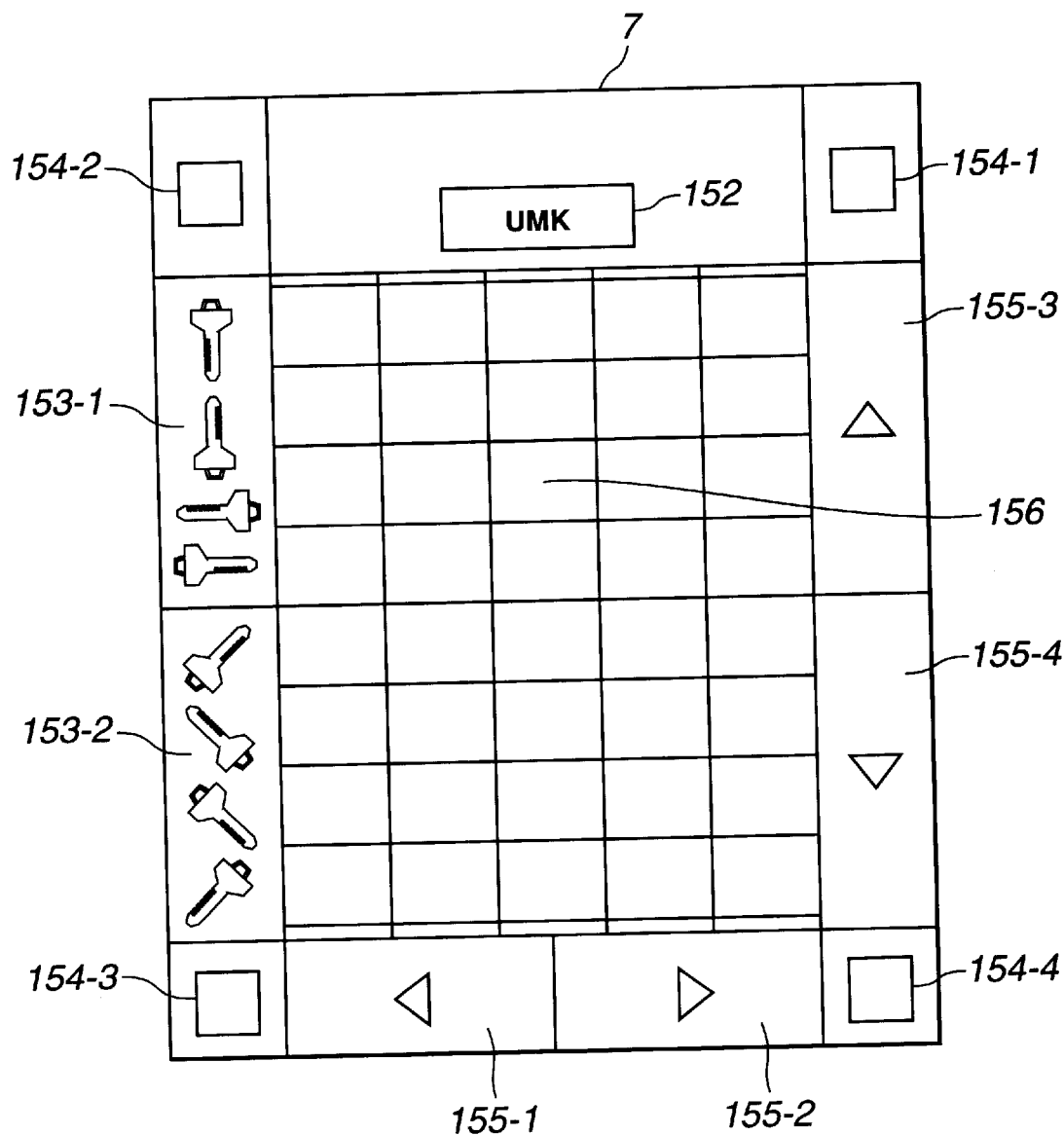
FIG. 17 shows an example of the UMK sticker.

FIG. 17 shows an example of the UMK sticker 7. The UMK sticker 7 is disclosed in detail as an information input medium in the JP Patent Application No. 9-324923 by the present Assignee. In an area 152, a predetermined character or pattern for the image recognition section 45 of the server 11 or the image recognition section 134 of the field desk 4 to recognize this sticker as a UMK sticker is described.

Figure 18:
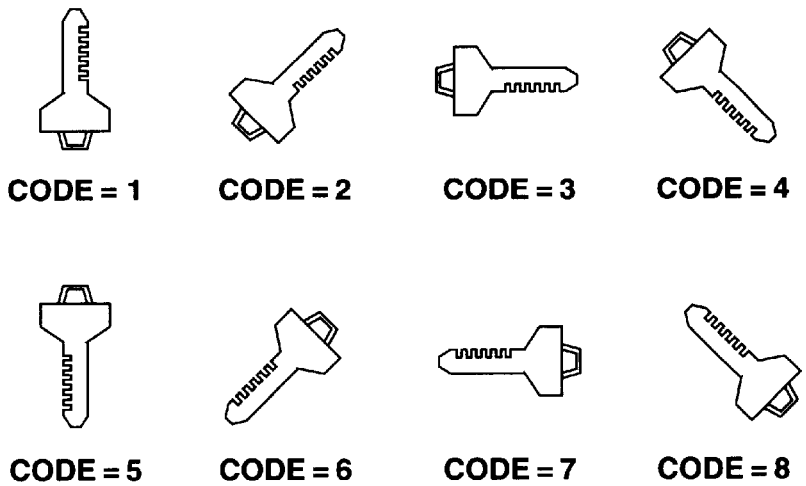
FIG. 18 shows codes of identification icons.
Figure 19:
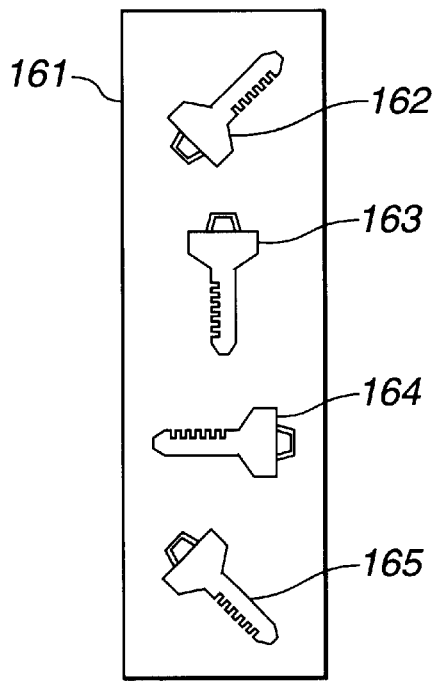
FIG. 19 shows an exemplary identification icon array.

In areas 153-1 and 153-2, identification icons corresponding to electronic information are described. With respect to the identification icons, one identification icon has rotation modes of eight directions and eight types of codes are defined in accordance with the directions, as shown in FIG. 18. For example, as shown in FIG. 19, an identification icon array including four identification icons 162, 163, 164 and 165 represents "2574". That is, the first identification icon 162 indicates "2". The second identification icon 163 indicates "5". The third identification icon 164 indicates "7". The fourth identification icon 165 indicates "4".

Referring again to FIG. 17, in areas 154-1 to 154-4, position correction marks used for correcting the position of an image picked up by the CCD camera 64-1 of the field player 2 are described.

In areas 155-1 to 155-4, marks for the user to carry out selective instruction are described. By selecting the marks described in the areas 155-1 to 1554, the user can select information which is not displayed in an area 156. That is, the areas 155-1 to 155-4 are used by the user to carry out selective instruction in the case where the selected information described in the area 156 of the UMK sticker 7 differs from the selected information displayed on the LCD 58.

In the area 156, information contents are described. By viewing the information described in the area 156, the user can learn what information can be accessed by using the UMK sticker. Also, after the field generator 1 recognizes the UMK sticker 7, the user can instruct the command processing section 48 of the server 11 to carry out predetermined processing by pointing to the information described in the area 156 with a finger or the like.

Figure 20:
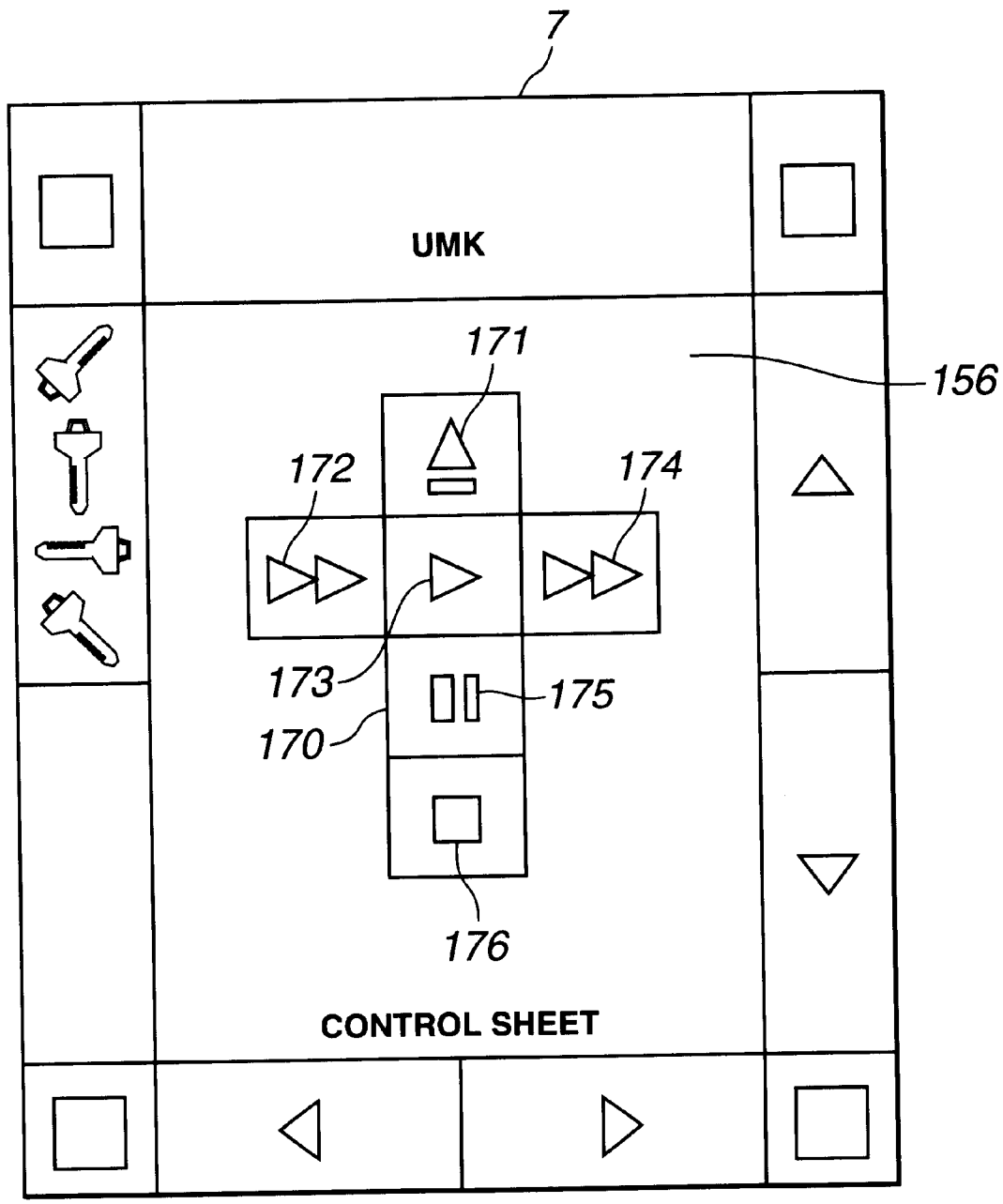
FIG. 20 shows an example of the UMK sticker.

For example, in the UMK sticker 7 shown in FIG. 20, the user can instruct the command processing section 48 of the server 11 to perform control of image data such as shift to next image data, rewind, playback, fast feed, pause and stop, by pointing to control command symbols 171, 172, 173, 174, 175 and 176 described in a control command symbol area 170 arranged in the area 156.

Figure 21:
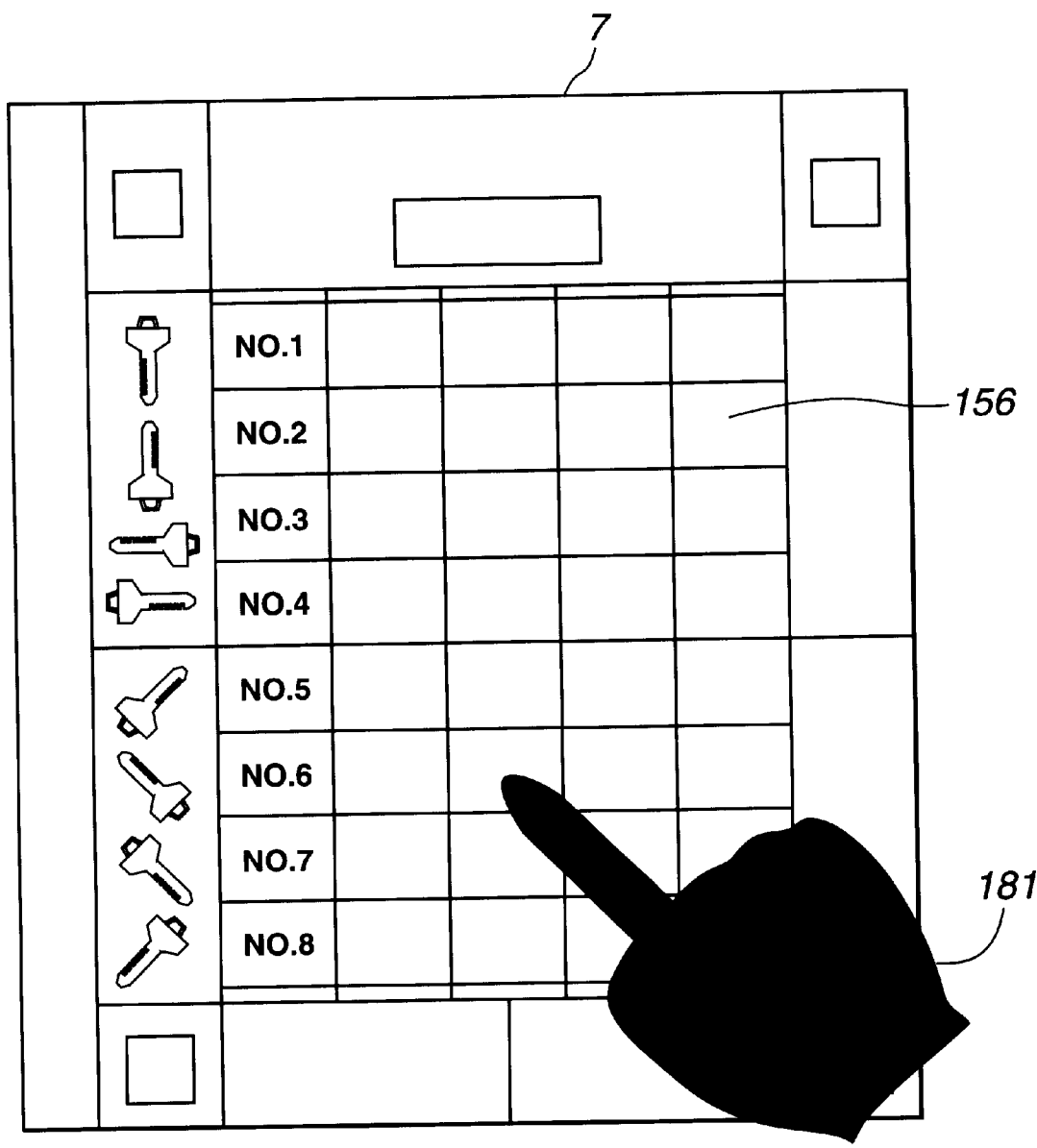
FIG. 21 shows the state of pointing to the menu of the UMK sticker with a finger.

In the above-described example, the control command symbols are described. However, the information contents described in the area 156 are not limited to the control command symbols and a menu, for example, may be described therein. In this case, as the user points to a menu item described in the area 156 with a finger of a hand 181 as shown in FIG. 21, information corresponding to the selected menu item is displayed on the LCD 58 of the field player 2. That is, as the command processing section 48 of the server 11 stores the position of the area 156 and the processing contents allocated to each position in the area 156 in accordance with the UMK sticker 7, it becomes possible to execute the stored processing.

The UMK sticker 7 need not be constituted by all the areas described above and may be constituted by a combination of necessary areas, for example, by only the areas 152 and 153-1.

Figure 22:
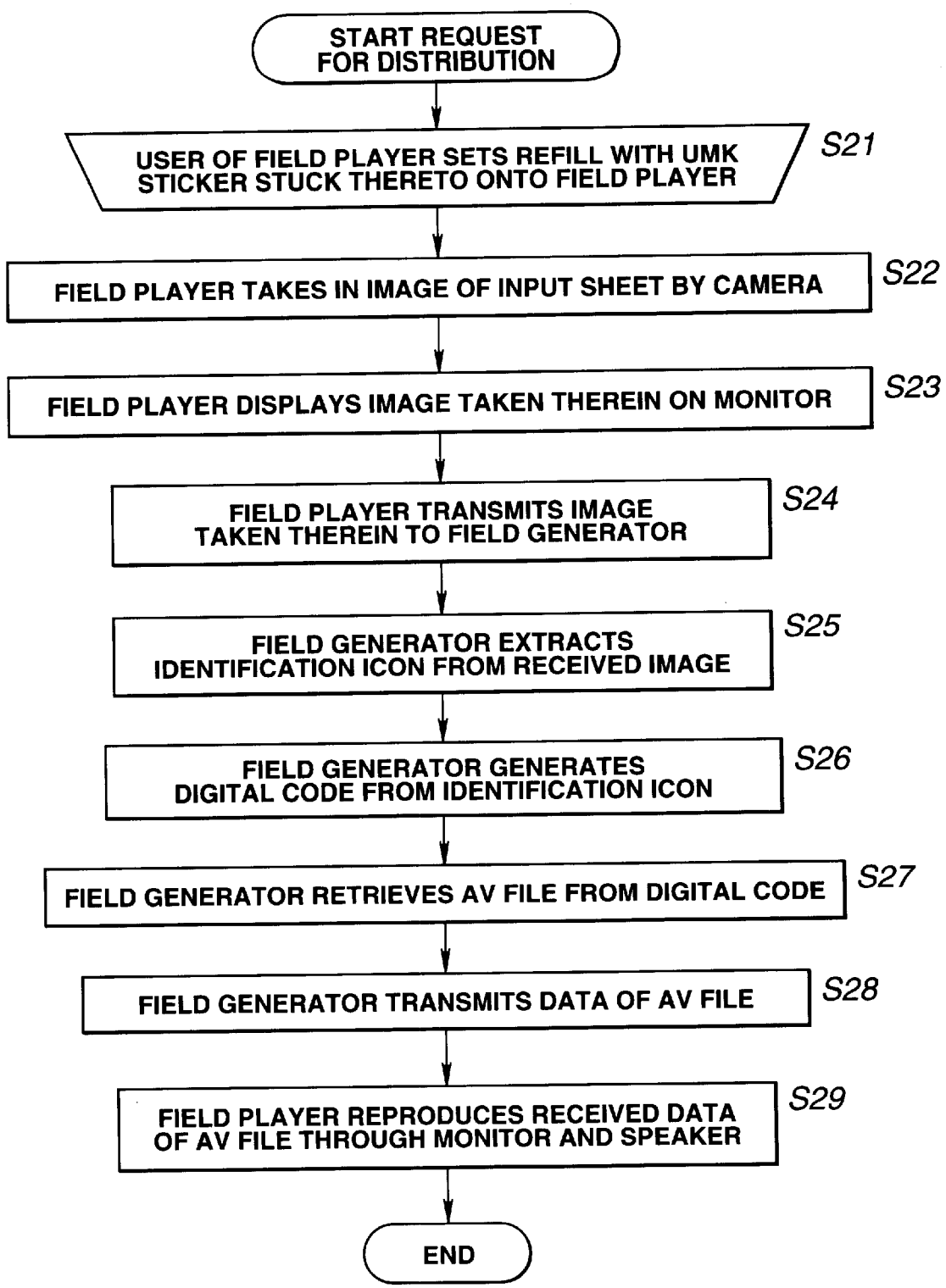
FIG. 22 is a flowchart for explaining the operation of the field player and the field generator, having a refill loaded thereon with a UMK sticker stuck on the refill, in the information providing system.

FIG. 22 is a flowchart for explaining the operation of the field player 2 and the field generator 1 in the case where the refill having the UMK sticker 7 stuck thereto is loaded on the field player 2. At step S21, the user of the field player 2 sets the refill 8 to which the UMK sticker 7 instructing distribution of information desired by the user is stuck, at a predetermined position in the field player 2. Alternatively, if a plurality of refills 8 including the refill 8 to which the UMK sticker 7 instructing distribution of information desired by the user is stuck are set in the field player 2, the user turns the refills 8 so that the surface of the desired refill 8 appears. At step S22, the field player 2 inputs the image of the refill 8 through the CCD camera 64-1 and displays the inputted image on the LCD 58. At step S24, the UMK image input section 74 of the field player 2 instructs the transmitter-receiver circuit control section 73 to transmit the image of the refill 8 to the field generator 1. The transmitter-receiver circuit control section 73 of the field player 2, having received the instruction, causes the transmitter-receiver circuit interface 54, the transmitter-receiver 55 and the antenna 56 to operate so as to transmit the signal including the image data of the refill 8 to the field generator 1.

At step S25, the image recognition section 45 of the server 11 extracts the identification icon from the image data of the refill 8 received through the transmitter-receiver interface 25 and outputs the extracted identification icon to the UMK processing section 46. At step S26, the UMK processing section 46, having received the identification icon, generates a digital code from the identification icon and outputs the digital code to the field generation control section 42. At step S27, the field generation control section 42 instructs the AV database 47 to output the data corresponding to the digital code to the transmitter-receiver control section 44. At step S28, in accordance with the instruction from the field generation control section 42, the transmitter-receiver control section 44 outputs the signal including the data outputted from the AV database 47, on a predetermined channel.

At step S29, the transmitter-receiver circuit control section 73 of the field player 2 receives the signal of the predetermined channel transmitted from the field generator 1. From the data included in the received signal, the image/sound reproduction section 71 displays the image on the LCD 58 and simultaneously reproduces the sound through the speaker 61.

As described above, the user of the field player 2 can obtain desired image and sound by using the refill 8 having the UMK sticker 7 stuck thereto, even without knowing the keyword of the desired image and sound. In this case, the information provider using the field generator 1 distributes a predetermined UMK sticker 7 to a user who made a contract. If that UMK sticker 7 is used, the information provider supplies image data of high picture quality and audio data of high sound quality on a predetermined channel. Thus, even when the user of the field player 2 who made a contract and the user of the field player 2 who did not make a contract are present at the same time in the transmission-reception area of the field generator 1, the contents of service can be made different.

Also, the contents of service may be made different in the following manner. That is, a code for identifying the user is stored in the user ID setting section 72 of the field player 2, and the field player 2 transmits the code for identifying the user together with the image data of the refill 8 to the field generator 1. The field generator 1, having received the code for identifying the user, compares the information stored in the user management database with the code for identifying the user, thus determining whether the user made a contract or not.

Moreover, the user of the field player 2 can obtain desired information, simply by loading at a predetermined position the refill 8 having the UMK sticker 7 stuck thereto. For example, if a user who understands only Italian demands the provision of information in Italian from the field generator 1 which normally provides information in Japanese, the user can immediately obtain information in Italian by using the refill 8 having a predetermined UMK sticker 7 stuck thereto.

Figure 23:
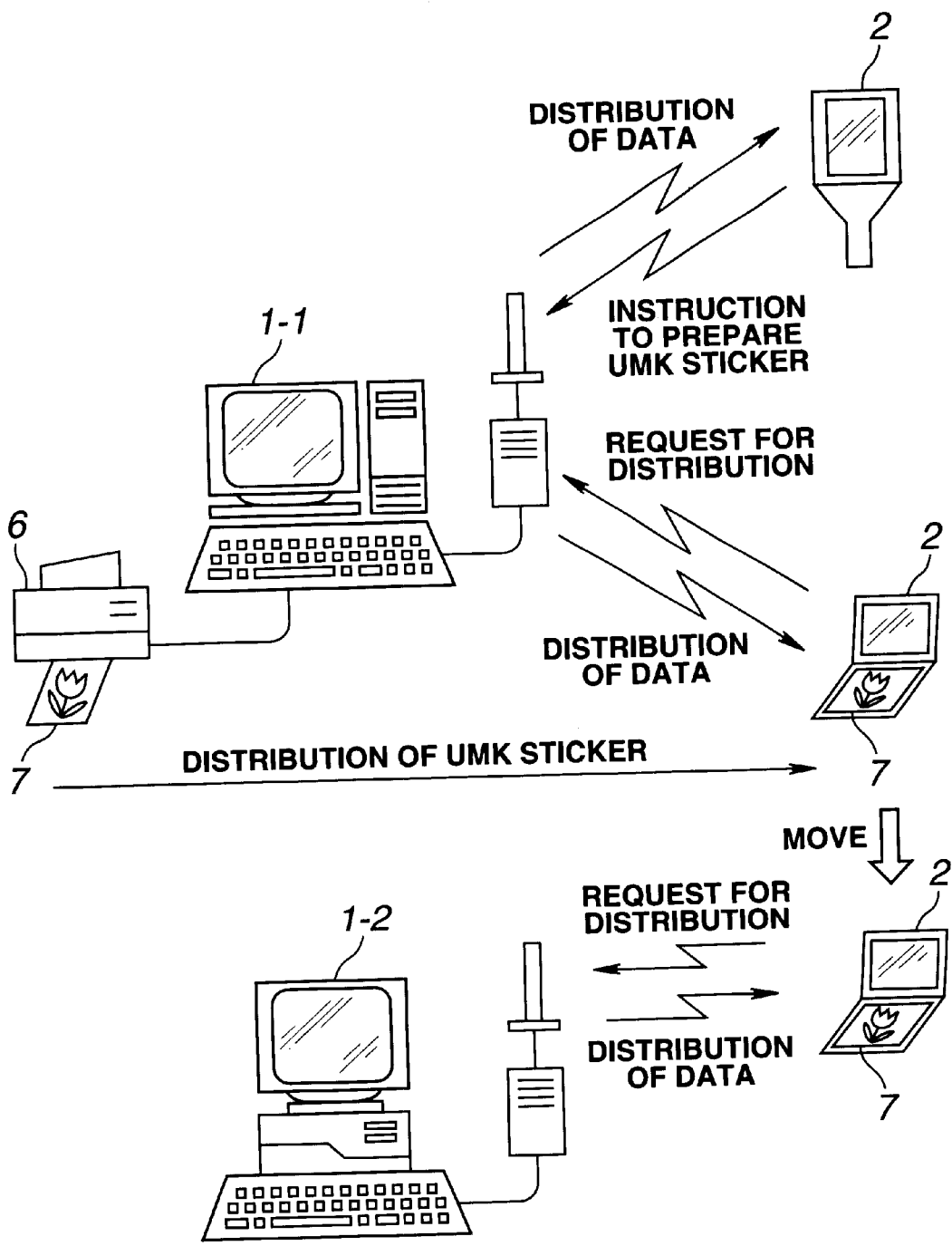
FIG. 23 illustrates the operation of the field recorder instructing the field generator to prepare a UMK sticker in the information providing system.

FIG. 23 illustrates the operation of the field recorder 3 instructing the field generator 1-1 to prepare the UMK sticker 7. If the user of the field recorder 3 recognizes the image displayed on the LCD 88 of the field recorder 3 or the sound reproduced through the speaker 91 on the basis of the data distributed from the field generator 1-1 and desires the provision of an image or sound of higher quality with the similar contents or the provision of the same image or sound again, the user instructs the field generator 1-1 to prepare the UMK sticker 7. The field generator 1-1, having received the instruction, causes the field printer 6 to print the UMK sticker 7 corresponding to the image or sound desired by the user of the field recorder 3. The information provider using the field generator 1-1 supplies the UMK sticker 7 to the user who instructed the print from the field recorder 3. As the user of the field recorder 3 uses the UMK sticker 7 on the field player 2, the field player 2 instructs the field generator 1-1 to distribute data, thus enabling the user to receive the provision of the same image or sound as described above or the image or sound of higher quality.

Moreover, on the UMK sticker which the field recorder 3 instructed the field generator 1 to prepare, the image and sound to be provided and information related to the preparation are recorded. For example, if the information provider using the field generator 1-1 is a florist and the image to be provided is an image of "orchid", the place and time at which the preparation of the UMK sticker 7 is instructed by the field recorder 3 and information such as "flower", "plant", "nature" and the like representing the categories of the image of "orchid" are recorded on the UMK sticker 7. As the user of the field player 2 moves into the transmission-reception range of the field generator 1-2 used by another information provider and then uses the UMK sticker 7, the UMK processing section 46 of the field generator 1-2 causes the AV database 47 to retrieve information having much in coincidence or in common with the above-described information recorded on the UMK sticker 7 and distributes the data to the field player 2 in response to the distribution request from the field player 2.

In this manner, by using the UMK sticker 7 on the field player 2, the user can receive the provision of image or audio data similar to the attributes of the UMK sticker 7 even from the field generator 1 other than the field generator 1 instructed to prepare the UMK sticker 7.

Figure 24:
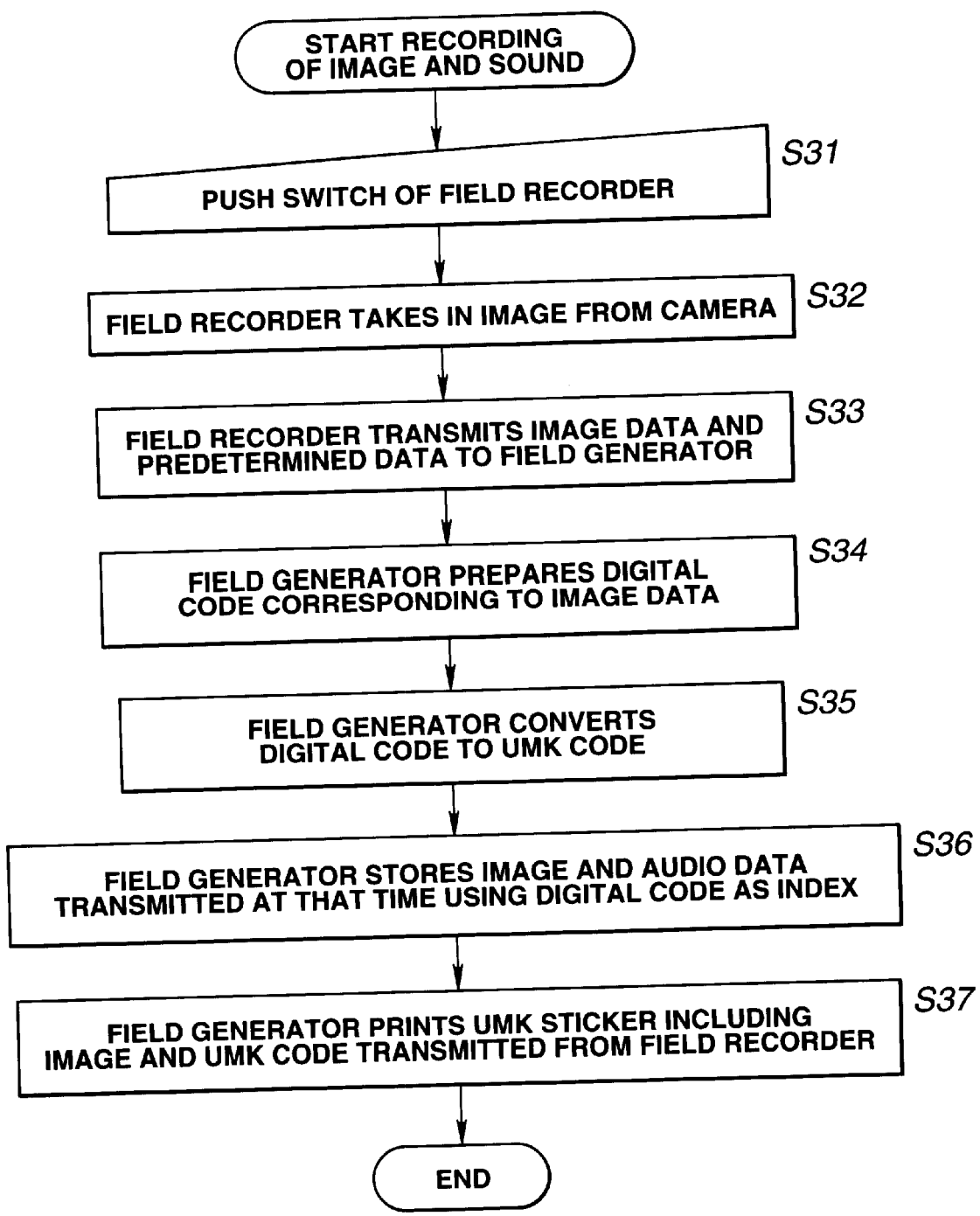
FIG. 24 is a flowchart for explaining the operation of the field recorder instructing the field generator to prepare a UMK sticker in the information providing system.

FIG. 24 is a flowchart for explaining the operation of the field recorder 3 instructing the field generator 1 to print the UMK sticker 7. At step S31, when the image and audio data the provision of which is desired by the user again is being distributed, the user pushes the switch 89 of the field recorder 3. At step S32, the UMK image input section 104 of the field recorder 3 inputs the image from the CCD camera 95-1 and prepares data corresponding to the image. At step S33, the UMK image input section 104 of the field recorder 3 instructs the transmitter-receiver circuit control section 103 to transmit the image data prepared at step S32 to the field generator 1. Moreover, the command transmission section 106 of the field recorder 3 instructs the transmitter-receiver circuit control section 103 to transmit to the field generator 1 the code instructing preparation of the UMK sticker 7. The transmitter-receiver circuit control section 103, having received these instructions, controls the transmitter-receiver circuit interface 84 to transmit the signal including the image data and the code to the field generator 1.

At step S34, the command processing section 48 of the server 11 inputs the code included in the signal transmitted from the field recorder 3 through the transmitter-receiver interface 25 and instructs the UMK processing section 46 to prepare a digital code corresponding to the file which is currently being outputted from the AV database 47. At step S35, the UMK processing section 46 of the server 11 converts the digital code prepared at step S34 to a UMK code and sends the UMK code to the UMK sticker print processing section 49. At step S36, the UMK processing section 46 instructs the AV database 47 to prepare and register an index for specifying the file outputted from the AV database 47 from the digital code. At step S37, the UMK sticker print processing section 49 of the server 11 instructs the field printer 6 to print the UMK sticker on the basis of the image data included in the signal transmitted from the field recorder 3 and the UMK code data through the transmitter-receiver interface 25. The field printer 6, having received the instruction to print the UMK sticker 7, prints the UMK sticker 7 on the basis of the image data and the UMK code data.

As described above, the user can cause the field generator 1 to print the UMK sticker 7 by operating the field recorder 3. The field recorder 3 may receive image data necessary for printing the UMK sticker 7 from the field generator 1 and cause the field printer 6 connected with the field recorder 3 to print the UMK sticker 7. Furthermore, the user can instruct the field desk 4 to record image data necessary for printing the UMK sticker 7 or image and audio data the provision of which is desired by the user, by operating the field recorder 3.

Figure 25:
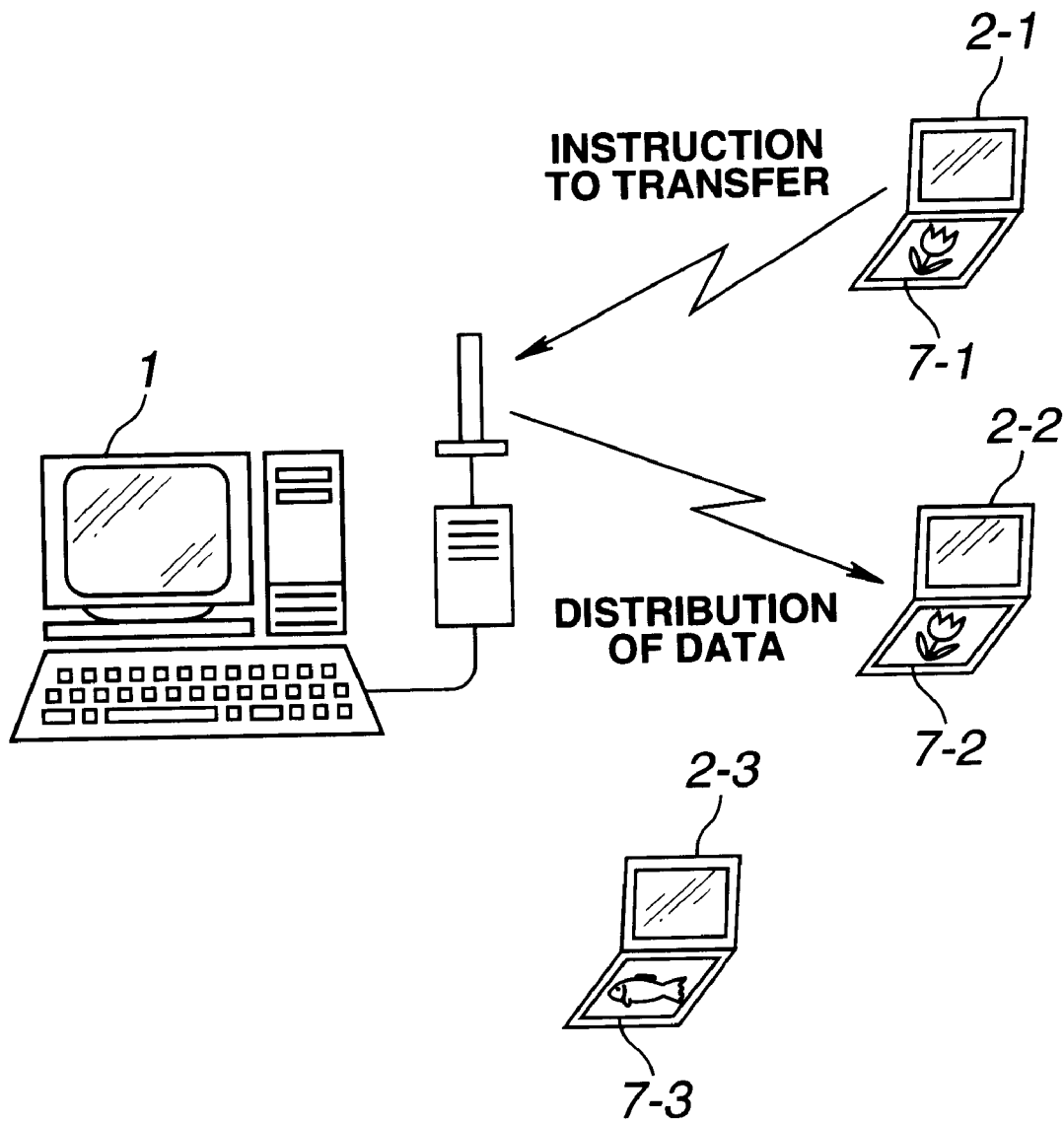
FIG. 25 illustrates the operation of the field player instructing the field generator to transfer data to another field player in the information providing system.

FIG. 25 illustrates the operation of the field player 2-1 instructing the field generator 1 to transfer data to another field player 2-2. By pointing to the areas 155-1 to 155-4 or the area 156 of the UMK sticker 7-1 with a finger, the user of the field player 2-1 can cause the field generator 1 to transfer of the UMK sticker 7-2 storing the same or similar information therein to the field player 2-2 which is currently being used. In this case, the range of similar information recorded on the UMK sticker 7 is determined by the information recorded on the UMK sticker 7-1 or by the operation of the field player 2-1 by the user. Distribution of data from the field generator 1 in response to the instruction from the field player 2-1 is not carried out to the field player 2-3 using the UMK sticker 7-3 which is discriminated as having no similar information recorded thereon.

Figure 26:
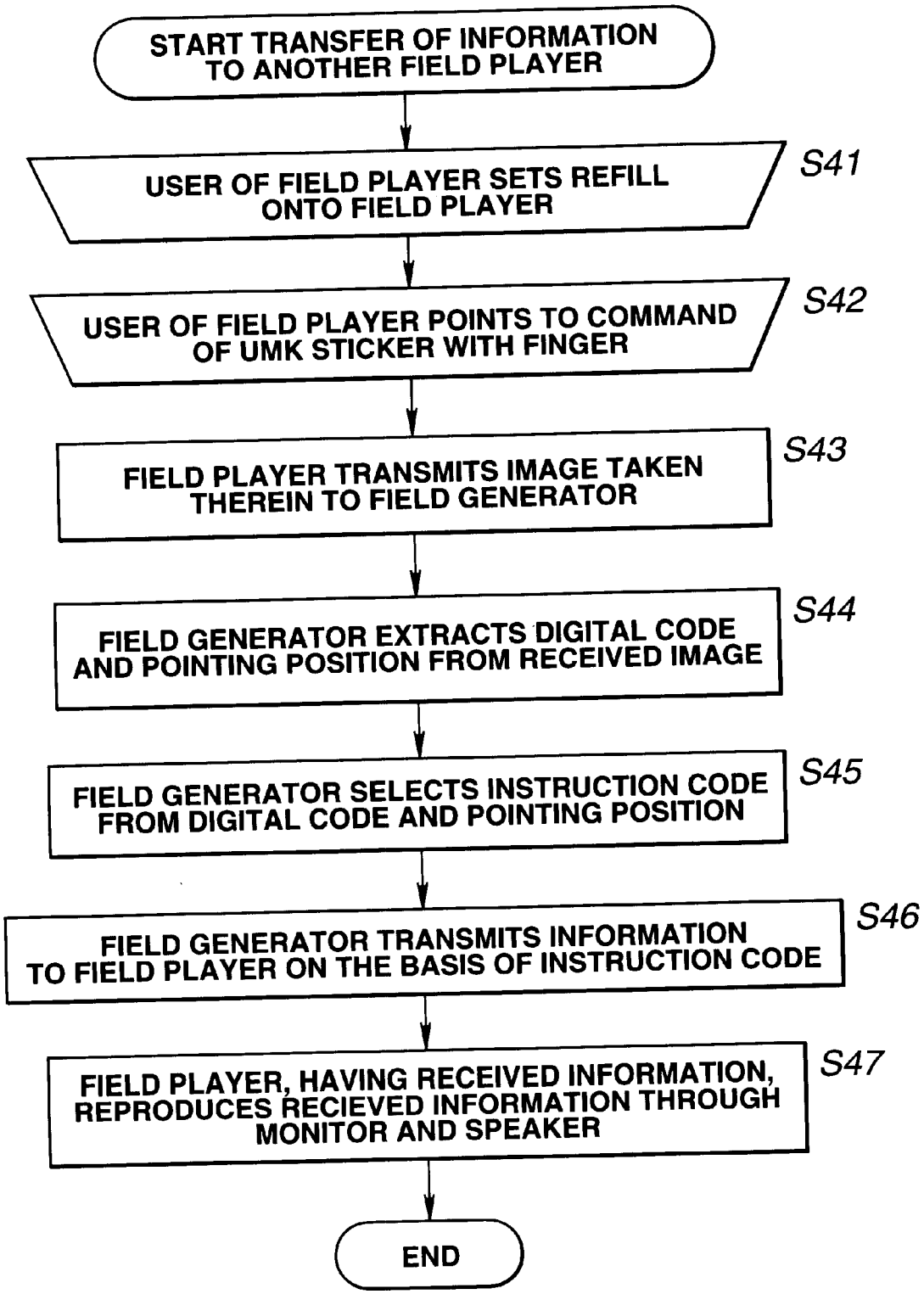
FIG. 26 is a flowchart for explaining the operation of the field player instructing the field generator to transfer data to another field player in the information providing system.

FIG. 26 is a flowchart for explaining the operation of the field player 2 instructing the field generator 1 to transfer data to another field player 2. At step S41, the user of the field player 2 sets the refill 8 having a predetermined UMK sticker 7 stuck thereto onto the field player 2. At step S42, the user of the field player 2 points to a command of a predetermined area of the UMK sticker with a finger. At step S43, the UMK image input section 74 of the field player 2 instructs the transmitter-receiver circuit control section 73 to transfer to the field generator 1 the image of the command of the predetermined area of the UMK sticker pointed to with a finger, inputted from the CCD camera 64-1. The transmitter-receiver circuit control section 73 controls the transmitter-receiver circuit interface 54 to transmit the signal including the image data to the field generator 1.

At step S44, the image recognition section 45 of the server 11 inputs the image data of the refill 8 included in the signal transmitted from the field player 2 through the transmitter-receiver interface 25, then extracts the identification icon from the image data, and outputs the extracted identification icon to the UMK processing section 46. Moreover, the image recognition section 45 extracts the pointing position of the finger of the user from the image data and outputs the extracted pointing position to the command processing section 48. The UMK processing section 46, having received the identification icon, generates a digital code from the identification icon and outputs the digital code to the command processing section 48. At step S45, the command processing section 48 of the server 11 retrieves a table showing the corresponding relation between the positions of the area 156 and command codes indicating the processing contents to be allocated to the respective positions of the area 156 with respect to the UMK sticker 7, using the digital code and the pointing position, and then selects a command code. At step S46, the command processing section 48 of the server 11 instructs the field generation control section 42 to transmit the data stored in the AV database 47 or the user management database 41 to another field player on a predetermined channel in accordance with the selected command code. The field generation control section 42 instructs the AV database 47 or the user management database 41 to output predetermined data to the transmitter-receiver control section 44. In response to the instruction from the field generation control section 42, the transmitter-receiver control section 44 outputs a signal including the data outputted from the AV database 47 or the user management database 41 on a predetermined channel.

At step S47, the transmitter-receiver circuit control section 73 of another field player 2 receives the signal of the predetermined channel transmitted from the field generator 1. The image/sound reproduction section 71 displays the image on the LCD 58 and simultaneously reproduces the sound through the speaker 61 from the data included in the received signal.

As described above, the user of the field player 2 can transfer information to another field player 2. The transfer of information to another field player 2 is described above. Similarly, the user of the field player 2 can carry out operation such as correction and replacement of information held by the field player 2 or the field generator 1, by operating the field player 2 using a predetermined UMK sticker 7.

The field desk 4 has the functions of the field generator 1, the field player 2 and the field recorder 3. The field desk 4 is adapted for storing information obtained through the network 5-2 and information obtained from the field generator 1 using the UMK sticker 7 so that the user can use the information for the personal purposes. Therefore, the transmission-reception range and the capacity of the radio transmission line of the field desk 4 are basically smaller than those of the field generator 1.

In this specification, radio communication using a multiplex transmission line is used for the communication between the information providing device and the information processing device. However, a network using radio communication on the physical layer may be used. In this case, multicast as the transmission system and UDP (user datagram protocol) as the communication protocol of the transport layer can be used.

In this specification, the system represents the whole device constituted by a plurality of units.

As a program providing medium for providing a computer program for executing the above-described processing to the user, a communication medium such as a network or a satellite as well as a recording medium such as a magnetic disk, a CD-ROM or a solid state memory can be used.

Figure 27:
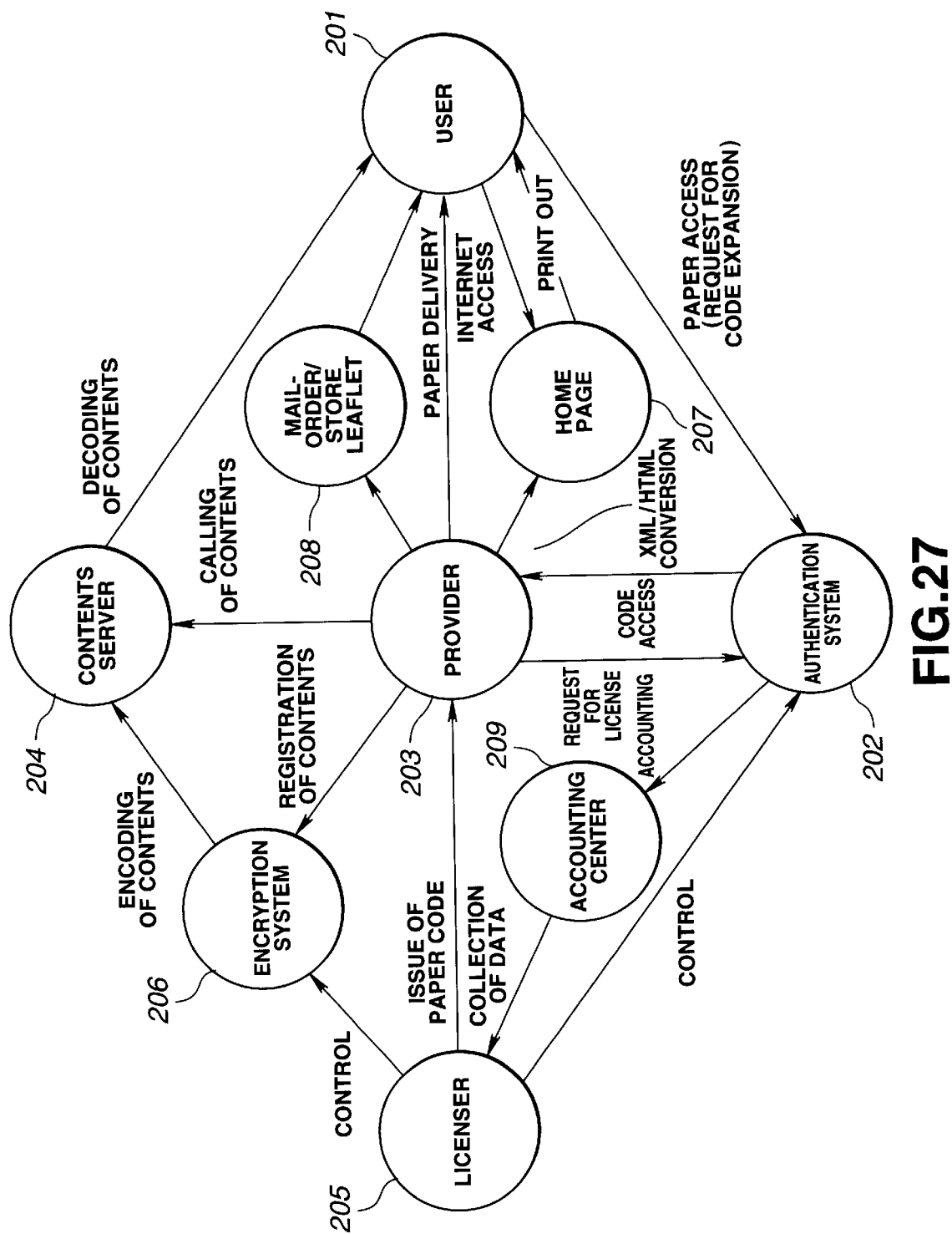
FIG. 27 shows the structure of a chargeable information service to which the information providing system is applied.

In the case where chargeable information service is provided, this information providing system is incorporated in a chargeable information service system, for example, as shown in FIG. 27.

The chargeable information service system shown in FIG. 27 has a provider which is accessed by the user through an authentication system. The provider calls the contents required by the user from a contents server storing the contents therein and supplies the contents to the user.

The contents registered by the provider in association with a paper code issued by a licenser are encrypted by an encryption system and stored in the contents server. The contents server decodes the contents requested to the provider from the user and supplies the decoded data to the user through a satellite.

In this chargeable information service system, the provider converts a UMK sheet corresponding to the access level of the contents associated with the paper code by XML/HTML conversion and puts the converted UMK sheet on the home page, or distributes the UMK sheet as mail-order/store leaflets. Alternatively, the provider sends the UMK sheet by means of the postal service. When a registration request as a contract user is issued from the user, the provider carries out user registration to an accounting center through the authentication system.

In this chargeable service system, the user who obtained the UMK sheet by accessing the home page and printing the UMK sheet, or the user who obtained the UMK sheet distributed as a mail-order/store leaflet or the UMK sheet mailed from the provider can access the field generator 1 by using the above-described field player 2, field recorder 3 or field desk 4.

In this chargeable service system, the following interactive fields are constituted.

The interactive fields are formed by "fields" where operation such as reference, obtaining, replacement, transmission, transfer, and correction of the information held by individuals or groups can be carried out. The "fields" are separately formed for each individual or group, and operation with respect to the "fields" is made possible depending on the coincidence of tolerance level of each other (level of disclosure and request for information) and the specified spatial tolerance. The concept including the principle of operation with respect to the "fields" is referred to as interactive fields. Field levels as elements forming the individual tolerance levels of the interactive fields and a field area representing the specified spatial tolerance will be defined hereinafter. The field levels and the field area are the concept designed to realize the appropriate provision of multimedia information in accordance with the preference and using position of the user. The field levels and the field area are realized by using a computer, a wide area network, and various radio transmission systems.

The outline of interactive fields has been presented by the inventor of the present invention at the 15th Meeting of the Japan Software Academy held on Sep. 8–11, 1998 at the University of Electric Communication.

Figure 28:
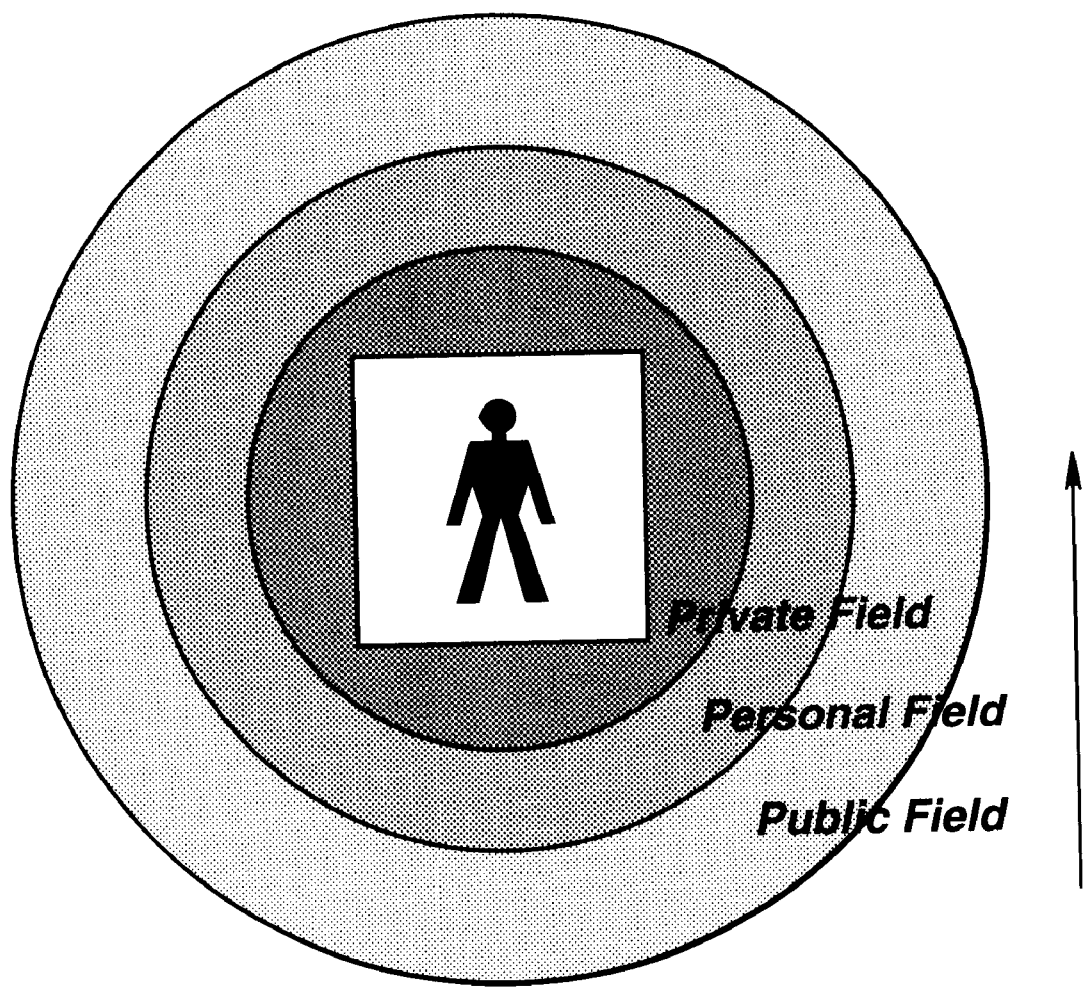
FIG. 28 shows the level structure of an interactive field to which the information providing system is applied.

The field levels are constituted by the following three levels (Private, Personal, and Public), for example, as shown in FIG. 28.

In the Public field where the general public is the target user, data of static images of low picture quality, characters, and sounds are provided. The user receives information in the form of broadcast from the field generator by using a field gear. From this information, the user can confirm the contents provided in the "field" to which the user himself/herself current belongs. For example, broadcasting services with respect the name of station and the present status of congestion of the route are provided near a station, and information such as today's special is broadcast near a convenience store or a restaurant.

In the Personal field where a dedicated user is the target user, data of dynamic images of low picture quality, static images of high picture quality, characters, and sounds are provided. Bidirectional is provided to enable confirmation of vacant seats and reservation of seats at stores and shops. In this Personal field, in the case where there is a correlation between an interactive field issued by the service firm and an interactive field of the user, information is distributed in accordance with the intensity and type of correlation. In accordance with the contents of the information accessed by the user, the interactive field is constantly updated by learning the preference. By accessing each field generator by using an advertisement with a UMK code obtained in front of a station, from a newspaper or from the Internet, the user can obtain multimedia information associated with the contents of the advertisement.

For example, if a leaflet of routes is set on the field gear near each "field" and then the item of status of congestion is selected, the status of congestion of the designated route is announced by means of image, sound and character information. Meanwhile, if a leaflet of commodity guide is set on the field gear near a convenience store or a restaurant and then the item of recommendation is designated, today's special is announced by means of image, sound and character information of the commodities.

In the Private field where a contractor is the target user, data of dynamic images of high picture quality, static images of high picture quality, characters, and sounds are provided. Bidirectional is provided to enable order through a menu or the like. In this Private field, a user who has made a contract with the provider generating each "field" can obtain multimedia information only for contract users, by using a leaflet having a UMK code added thereto which is periodically supplied from the provider through the postal service or the Internet.

For example, by setting a leaflet of ticket reservation sent from the route provider onto the field gear near each "field" and then inputting the items of route and date/time, the user can reserve a seat and receive the reserved ticket at the station counter. Meanwhile, by setting a leaflet of commodity order sent from the provider onto the field gear near a convenience store or a restaurant and then inputting an order number, the user can find the ordered commodities or seat prepared as soon as the user enters the shop or store.

In the Private field, in the case where there is a correlation between interactive fields of users, personal information can be arbitrarily exchanged to each other and the personal information can also be linked to various events such as presentation on the web, TV, magazines and the like.

As described above, as the classification of personal information is clarified like the field levels of Private, Personal, and Public, an individual as a user can access multimedia information of different levels in the same "field" by switching the level in accordance with various changes of status. This switching of the level can be carried out instantaneously and intuitively by using the UMK sticker 7, which is a multimedia interface of "paper".

The field area is set in an arbitrary form in accordance with the specified reach tolerance of "field" of each individual or group.

The arbitrary form in this case is a mechanism such that an individual or group wishing to generate a "field" specifies a range allowed to each individual or group, or a range which the individual or group wishes to tolerate, and thus will not influence the other "fields" than that "field" unnecessarily.

Specifically, at home, the field area is limited within the home. At shops and stores, and public bodies, the field area is limited within the region. At the broadcasting organizations, the specified reach tolerance of "field" is set within the range prescribed by the Radio Law and the like.

Means for realizing the specified reach tolerance will now be described.

Specifically, in generation of the "field" within a home for a very small number of people, low-power radio communication through infrared rays or minute radio waves is used. This area is referred to as a Home field area (Home FA). In generation of the "field" at stores or public organizations for a relatively large number of people in a specified region, radio communication using medium-scale power output is used. This area is referred to as a Local field area (Local FA). In generation of the "field" at broadcasting organizations for a very large number of people over a broad range, radio communication using large-scale power output of a satellite or the like is used. This area is referred to as a Wide field area (Wide FA).

The device for administering the generation of these various "fields" is generally referred as a field generator, and the above-described field generator 1 is equivalent thereto. The device for accessing these "fields" is generally referred to as a field gear, and the above-described field player 2, field recorder 3 and field desk 4 are equivalent thereto.

The field generator 1 mainly administers generation of "fields" and controls various operations on information (reference, obtaining, replacement, transmission, transfer, and correction) by the user holding the field gear in the interactive field in accordance with the tolerance level and the specified tolerance. Also, the field generator 1 is connected to various wide range networks, thus enabling access to the web site as a gateway machine.

In short, by carrying the field gear, the user can access various "fields" constituted in the Home FA, Local FA and Wide FA at any time in accordance with the necessity.

Figure 29:
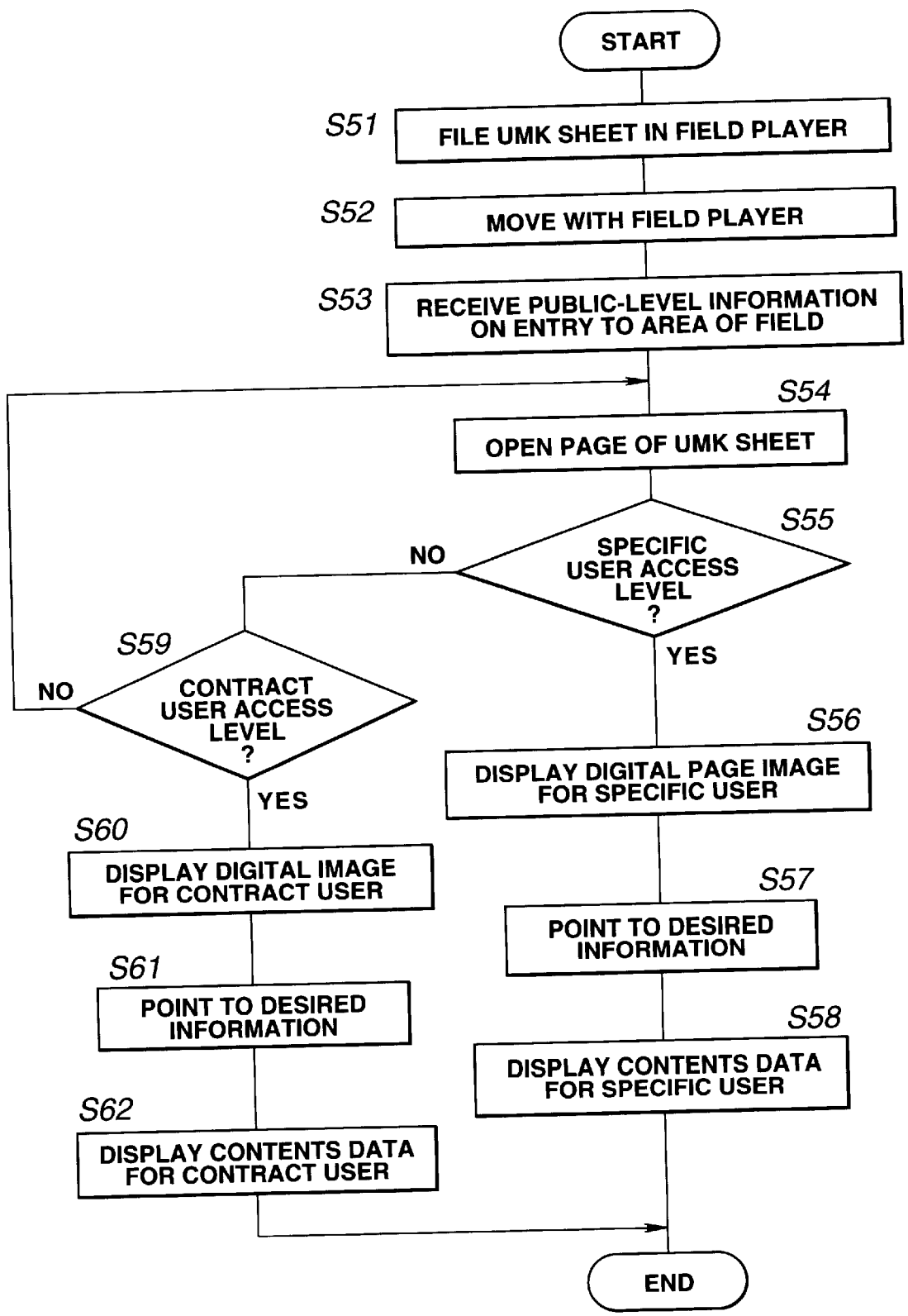
FIG. 29 is a flowchart showing an exemplary operation of the field player in the interactive field.

The procedure for obtaining information by the field player 2 using a UMK sheet in the interactive field will now be described with reference to FIG. 29.

At step S51, the user files a UMK sheet prepared by the user himself/herself or a UMK sheet distributed from a store or the like into a sheet holder of the field player 2. At step S52, the user moves within the home or on a street, carrying the field player 2.

At step S53, as the user enters a field generated by the field generator 1 of a station, multimedia information of the public level is sent to and then reproduced by the field player 2.

At the next step S54, the user receives the multimedia information, and if interested, the user opens the page of the UMK sheet corresponding to the information.

At step S55, the field generator 1 receives the image of the UMK sheet and discriminates whether the access level of the UMK sheet is the specific user access level or not.

If it is the specific user access level, the field generator 1 at step S56 sends a digital page image for specific user back to the field player 2. Thus, on the side of the field player 2, the digital page image for specific user is displayed.

At step S57, as the user touches the digital page image for specific user or the portion of information desired by the user displayed on the UMK sheet with a finger, the image of pointing to the information desired by the user is sent to the field generator 1. At step S58, the field generator 1 reproduces contents data for specific user on the basis of an information code corresponding to the information pointed by the transmitted image, and then sends the contents data for specific user back to the field player 2.

If the access level of the UMK sheet is not the specific user access level, the field generator 1 at step S59 discriminates whether the access level of the UMK sheet is the contract user access level or not.

If it is the contract user access level, the field generator 1 at step S60 sends back to the field player 2 a digital page image for contract user, registered in advance. Thus, on the side of the field player 2, the digital page image for contract user is displayed.

At step S61, as the user touches the digital page image for contract user or the portion of information desired by the user displayed on the UMK sheet with a finger, the image of pointing to the information desired by the user is sent to the field generator 1. At step S62, the field generator 1 reproduces contents data for contract user on the basis of an information code corresponding to the information pointed by the transmitted image, and then sends the contents data for contract user back to the field player 2.

Thus, for example, as the user files a UMK sheet for "restaurant" guide into the sheet holder of the field player 2 and enters the field of "restaurant" while walking on a street, guidance information such as "status of reservation of today" is announced. In the case where the user is interested in this information, as the user opens the page of "restaurant" and touches the display portion of "reservation" in the page, the procedure for registration of the name of a person who makes a reservation, the number of people, and time is reproduced by multimedia reproduction. Thus, the user can register reservation in accordance with instructions.

What is claimed is:

1. An information providing system comprising:
   an information providing device including image recognition means for recognizing an image pattern obtained by coding predetermined information, information detection means for detecting the image pattern recognized by the image recognition means, thereby detecting the predetermined information, information storage means for storing transmission information to be transmitted, information transmission means for wirelessly transmitting a signal including predetermined transmission information, and information transmission control means for controlling the information transmission means on the basis of the predetermined information detected by the information detection means so as to transmit the signal including the predetermined transmission information of the transmission information stored in the information storage means;

an information input medium having the predetermined information instructing an operation of the information providing device as an image pattern of coded image data; and a portable information processing device including image input means for inputting the image pattern of the information input medium, image data transmission means for wirelessly transmitting the image pattern inputted by the image input means to the information providing device, signal receiving means for wirelessly receiving the signal including the predetermined transmission information wirelessly transmitted by the information transmission means of the information providing device, and information reproduction means for reproducing the predetermined transmission information on the basis of the signal obtained by reception by the signal receiving means;

wherein the information transmission control means causes the information transmission means to further transmit a second signal including an other predetermined transmission information of the predetermined transmission information stored in the information storage means of the information providing device on the basis of designated position information selected by a user on the information input medium inputted by the image input means of the information providing device and recognized by the image recognition means of the information providing device and the predetermined information held by the information input medium detected by the information detection means of the information providing device;

the signal receiving means of the information processing device receives the second signal including said other predetermined transmission information outputted by the information transmission means of the information providing device; and the information reproduction means of the information processing device further reproduces said other predetermined transmission information on the basis of the second signal received by the signal receiving means.

2. The information providing system as claimed in claim 1, wherein the information input medium is an advertisement sheet.

3. The information providing system as claimed in claim 1, wherein the information input medium contains a plurality of access levels to the information providing device by the information processing device and an image pattern of image data obtained by coding authentication information indicating the contents of information held by the information input medium, and wherein the information providing device has access level setting means for setting an access level from the plurality of access levels to the information processing device.

4. The information providing system as claimed in claim 3, wherein the information input medium is an advertisement sheet.

5. The information providing system as claimed in claim 1, wherein the information input medium is distributed by a provider accessed through an authentication system for controlling user registration and accounting processing.

6. The information providing system as claimed in claim 5, wherein the information input medium is an advertisement sheet.

7. The information providing system as claimed in claim 1, wherein when the image recognition means does not recognize the image pattern transmitted from the information processing device, the information providing device transmits predetermined transmission information stored in the information storage means to the information processing device, and wherein when the image recognition means recognizes the image pattern and then an access level and authentication information are detected by the information detection means, the information providing device provides information corresponding to the access level and the authentication information on the basis of the result of detection.

8. The information providing system as claimed in claim 7, wherein the information input medium is an advertisement sheet.

9. An information processing device comprising:

image input means for inputting image data of an information input medium having information instructing an operation of an information providing device as an image pattern of coded image data;

image data transmission means for wirelessly transmitting the image data inputted by the image input means to the information providing device;

signal receiving means for wirelessly receiving a signal including predetermined transmission information transmitted from the information providing device; and information reproduction means for reproducing the predetermined transmission information on the basis of the signal received by the signal receiving means;

wherein the signal receiving means receives a second signal including an other predetermined transmission information outputted from the information providing device on the basis of designated position information selected by a user on the information input medium inputted by the image input means and the information held by the information input medium;

the information reproduction means further reproduces said other predetermined transmission information on the basis of the second signal received by the signal receiving means; and the information processing device is a portable device.

10. The information processing device as claimed in claim 9, further comprising identification information adding means for adding identification information of a user to the image data of the information input medium, so that the image data of the information input medium is transmitted with the identification information of the user added thereto.

11. The information processing device as claimed in claim 9, further comprising print data preparation instruction means for instructing the information providing device to prepare print data of the information input medium having information instructing the operation of the information providing device as an image pattern of coded image data.

12. An information processing method for use in a portable information processing device comprising the steps of:

inputting image data of an information input medium having information instruction an operation of an information providing device as an image pattern of coded image data;

transmitting the image data input at the inputting step to the information providing device using a wireless transmission method;

receiving a signal including predetermined transmission information transmitted from the information providing device using the wireless transmission method;

reproducing the predetermined transmission information on the basis of the signal received at the receiving step;

inputting designated position information selected by a user on the information input medium;

transmitting the inputted designated position information to the information providing device;

receiving a second signal including an other predetermined transmission information transmitted from the information providing device on the basis of the transmitted designated position information and the information held by the information input medium; and reproducing said other predetermined transmission information on the basis of the second signal.

* * * * *